(12) United States Patent
Obata

(10) Patent No.: US 9,183,989 B2
(45) Date of Patent: Nov. 10, 2015

(54) VARIABLE CAPACITANCE TYPE DOUBLE-LAYERED CAPACITOR INCLUDING INSIDE MEMBER HOUSED IN OUTSIDE MEMBER

(71) Applicant: Wacom Co., Ltd., Saitama (JP)

(72) Inventor: Masayuki Obata, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 242 days.

(21) Appl. No.: 13/892,989

(22) Filed: May 13, 2013

(65) Prior Publication Data

US 2014/0009863 A1 Jan. 9, 2014

(30) Foreign Application Priority Data

Jul. 5, 2012 (JP) ................................. 2012-151357

(51) Int. Cl.
| H01G 5/14 | (2006.01) |
| H01G 5/013 | (2006.01) |
| G01D 5/241 | (2006.01) |
| G06F 3/0354 | (2013.01) |
| H01G 4/28 | (2006.01) |

(52) U.S. Cl.
CPC .............. *H01G 5/14* (2013.01); *G01D 5/2412* (2013.01); *G01D 5/2417* (2013.01); *G06F 3/03545* (2013.01); *H01G 5/0136* (2013.01); *H01G 4/28* (2013.01)

(58) Field of Classification Search
CPC ......... H01G 5/14; H01G 5/0136; H01G 5/04; H01G 4/28; H01G 5/145; H01G 5/38; H01G 5/011; H01G 5/01

USPC .......... 361/283.1, 283.2, 288, 292, 278, 294, 361/295, 296, 297
See application file for complete search history.

(56) References Cited

U.S. PATENT DOCUMENTS

| 1,610,122 | A | * | 12/1926 | Edenburg ....................... 361/297 |
| 3,274,465 | A | * | 9/1966 | Spielman et al. ............. 361/294 |
| 3,336,515 | A | * | 8/1967 | Seiden et al. ................. 361/295 |
| 3,566,221 | A | * | 2/1971 | Sargent et al. ................. 361/280 |
| 4,845,586 | A | * | 7/1989 | Blickstein ..................... 361/292 |

(Continued)

FOREIGN PATENT DOCUMENTS

| FR | 2886450 A1 | 12/2006 |
| GB | 1480703 | 7/1977 |
| JP | 04096212 A | 3/1992 |

OTHER PUBLICATIONS

Extended European Search Report dated Nov. 20, 2013, for corresponding EP Application No. 13173319.8-1808, 7 pages.

*Primary Examiner* — David M Sinclair
(74) *Attorney, Agent, or Firm* — Seed IP Law Group PLLC

(57) ABSTRACT

A variable capacitance type capacitor includes an inside member and an outside member including a space for housing the inside member. The inside member has a columnar shape, and a first conductor pattern is formed on a circumferential surface thereof. The outside member has a predetermined dielectric constant, and a second conductor pattern is formed on an outer circumferential surface thereof so as to oppose the first conductor pattern formed on the inside member. The inside member housed in the space of the outside member is displaced relative to the outside member in a direction of a central axis of the inside member in response to an externally applied force, and an opposed area between the first conductor pattern and the second conductor pattern changes to thereby form a capacitance corresponding to the externally applied force between the first electrode and the second electrode.

20 Claims, 15 Drawing Sheets

(56) References Cited

U.S. PATENT DOCUMENTS 5,206,785 A    4/1993   Hukashima
2003/0048592 A1 *  3/2003   Thomas et al. ............ 361/283.2
2003/0137300 A1    7/2003   Gonella et al.
2007/0070578 A1 *  3/2007   Grossniklaus et al. .... 361/321.6

* cited by examiner

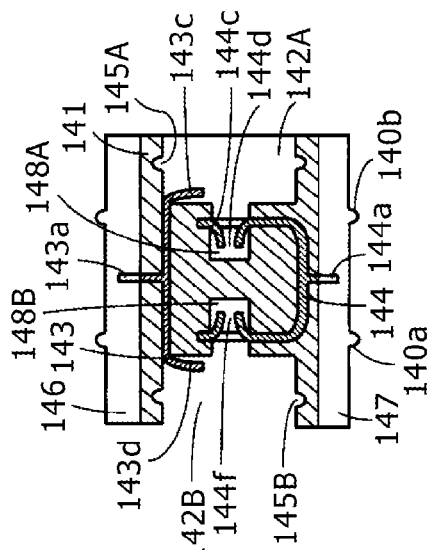
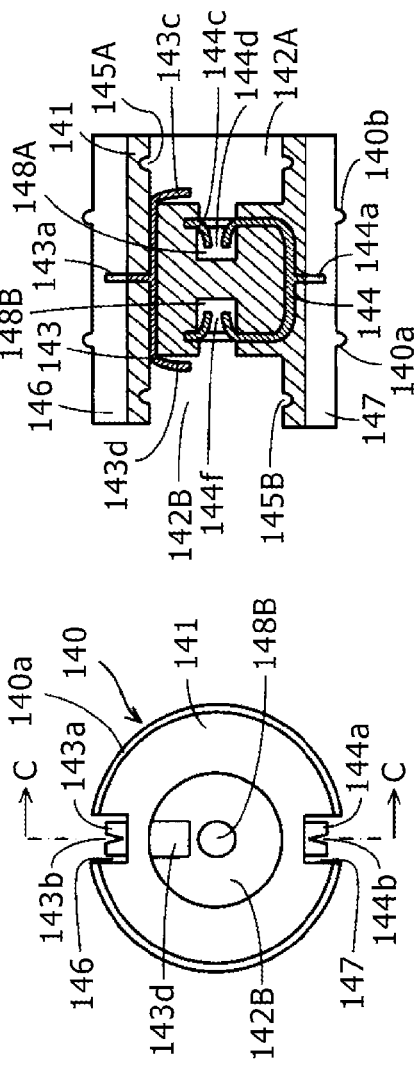
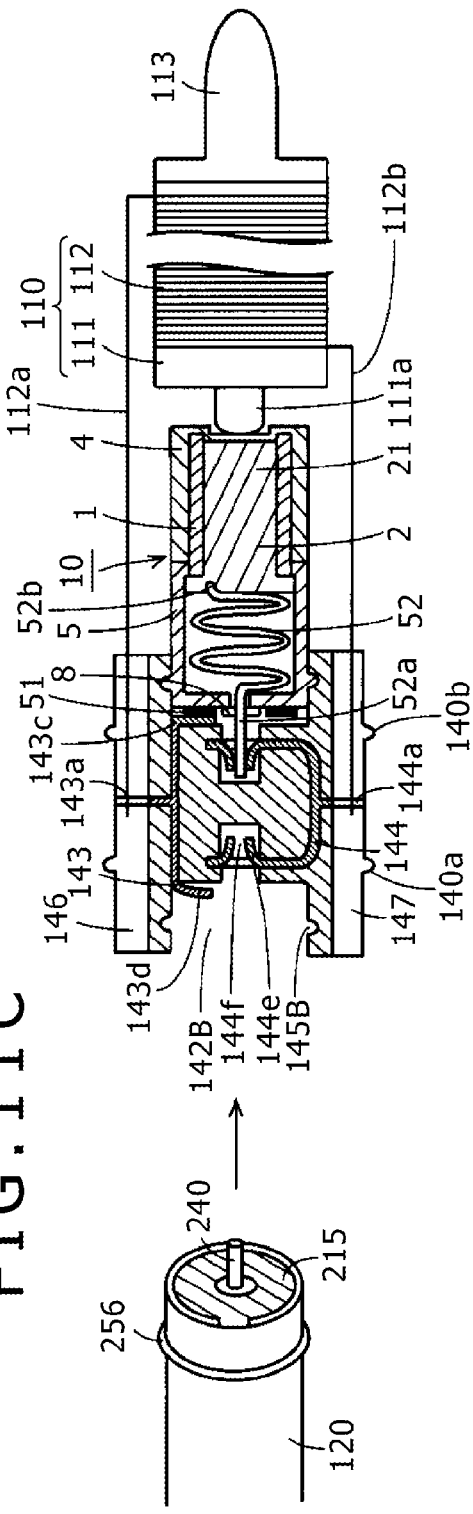

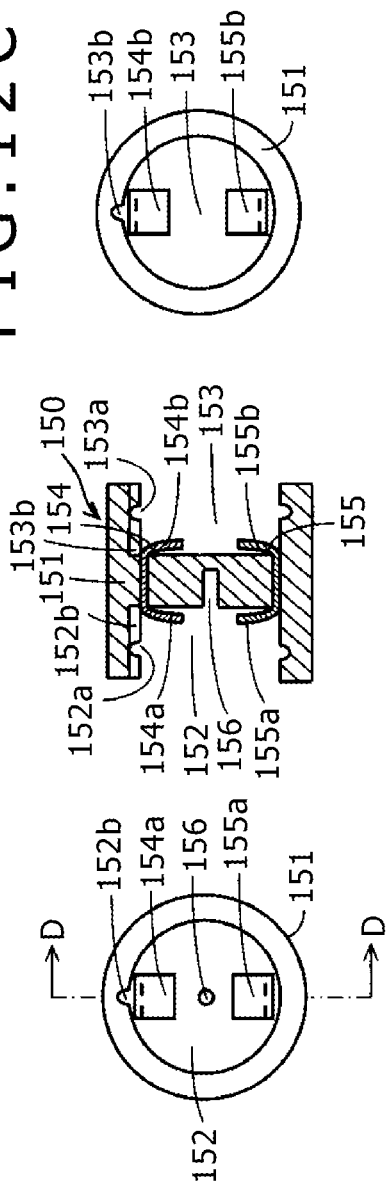

VARIABLE CAPACITANCE TYPE DOUBLE-LAYERED CAPACITOR INCLUDING INSIDE MEMBER HOUSED IN OUTSIDE MEMBER

CROSS-REFERENCE TO RELATED APPLICATION(S)

The present application claims priority under 35 U.S.C. 119(a) of Japanese Application No. 2012-151357, filed Jul. 5, 2012, the entire content of which is incorporated herein by reference.

BACKGROUND

1. Technical Field

The present invention relates to a variable capacitance type capacitor that detects externally applied pressure as a change in capacitance.

2. Background Art

As an example of a position input device used as an input device for a personal computer or the like, there is known for example a position input device including a position indicator, the position indicator having the shape of a pen and including a pen pressure detecting section, and a position detecting device having an input surface on which a pointing operation and the input of characters, figures, and the like are performed by using the position indicator.

A variable capacitance type capacitor as described in Patent Document 1 (Japanese Patent Laid-Open No. Hei 04-96212) has conventionally been used as the pen pressure detecting section of the position indicator. The variable capacitance type capacitor described in this Patent Document 1 includes, as mechanistic structural parts housed within a long and thin cylindrical casing, a first conductor attached to one end surface of a cylindrical dielectric and a flexible second conductor capable of elastic displacement disposed on another end surface side of the dielectric opposite to the one end surface of the dielectric. A surface of the second conductor, which faces the dielectric, has such a shape as to swell in the form of a dome toward the dielectric, for example.

The variable capacitance type capacitor described in Patent Document 1 also includes a spacer for separating the second conductor from the other end surface of the dielectric by a small interval except for a portion of the second conductor and the other end surface of the dielectric. The variable capacitance type capacitor also includes a part for applying a relative pressure or displacement between the second conductor and the dielectric. The part for applying the relative pressure or displacement is coupled to a core body of the pen-shaped position indicator. When a pen pressure is applied to the position indicator from one end part of the casing of the position indicator, a force applied in an axial direction to the core body displaces the flexible second conductor toward the dielectric side, and thus causes the second conductor to touch the other end surface of the dielectric. Then, the swelling end surface of the flexible second conductor is in the shape of a dome touches the other end surface of the dielectric with a contact area corresponding to the pressing force. Therefore a capacitance formed between the second conductor and the first conductor with the dielectric interposed therebetween changes.

PRIOR ART DOCUMENT

Patent Document

[Patent Document 1]
Japanese Patent Laid-Open No. Hei 04-96212

SUMMARY OF THE INVENTION

Problems to be Solved by the Invention

The variable capacitance type capacitor of the position indicator in Patent Document 1 described above has a large number of parts, including the dielectric, the first conductor, the second conductor, the spacer, a holding body for holding the dielectric, terminal members for connecting the first and second conductors to a printed wiring board, and the like. In addition, each of the parts is a separate mechanism part. Therefore, the construction of the position indicator is complex, and also it requires time to assemble the position indicator. The construction of the position indicator thus entails high cost and is unsuitable for mass production.

For mass production, the variable capacitance type capacitor described in Patent Document 1 may be formed as a modularized part by putting together the many parts in advance. However, position indicators in the shape of a pen have recently been desired to be thinner in view of that portable type electronic devices have been miniaturized such as PDAs, advanced portable telephone terminals (smartphones), and the like.

However, the variable capacitance type capacitor of the position indicator in Patent Document 1 described above has a plurality of groups of parts arranged in a direction of application of pressure, and elastically displaces the second conductor according to applied pressure. Thus, when the groups of parts are put together into a modularized part in advance, the parts need to be housed within a predetermined hosing member, and it is difficult to miniaturize the modularized part. Therefore the modularized part presents a problem in thinning the pen-shaped position indicator. In addition, the thinner the pen-shaped position indicator becomes, the more difficult it is to secure a space between the second conductor and the other end surface of the dielectric.

In addition, when a modularized part is made by putting together a predetermined group of parts, it takes time to put together the group of parts. Thus, a worker needs to take time to put together the group of parts into the modularized part, and thereafter combine the modularized part with other parts and dispose the parts within a case, which results in poor productivity.

In view of the above points, according to one aspect of the present invention, a variable capacitance type capacitor is provided, which has a simple construction, can be easily housed in a thin type casing such as that of a position indicator or the like, and can be readily put into mass production.

Means for Solving the Problems

In order to solve the above problems, according to the present invention, there is provided a variable capacitance type capacitor including: an inside member; and an outside member including a space for housing the inside member; the inside member having a columnar shape, and having a first conductor pattern formed on a circumferential surface of the inside member; the outside member being a dielectric having a predetermined dielectric constant, and having a second conductor pattern formed on an outer circumferential surface of the outside member, the second conductor pattern being disposed so as to oppose the first conductor pattern formed on the circumferential surface of the inside member when the inside member is housed in the space of the outside member; and the inside member housed in the space of the outside member and having the columnar shape being displaced relative to the outside member in a direction of a central axis of the inside member having the columnar shape in response to an externally applied force, whereby an opposed area formed between the first conductor pattern and the second conductor pattern disposed with the dielectric interposed between the first conductor pattern and the second conductor pattern changes, and a capacitance corresponding to the externally applied force is formed between the first conductor pattern and the second conductor pattern.

In the variable capacitance type capacitor according to the present invention, the inside member is displaced relative to the outside member in the direction of the central axis of the columnar shape of the inside member in response to the externally applied force, whereby the first conductor pattern is displaced relative to the second conductor pattern, and the opposed area between the first conductor pattern and the second conductor pattern that oppose each other with the dielectric of the outside member interposed between the first conductor pattern and the second conductor pattern changes according to the applied pressure. The variable capacitance type capacitor according to the present invention therefore has the capacitance corresponding to the externally applied force between a first electrode and a second electrode.

The variable capacitance type capacitor according to the present invention is formed with the inside member housed within the space of the outside member, and is thus formed as a capacitor having a simple construction essentially formed as one device. The variable capacitance type capacitor according to the present invention, having the construction housing the inside member of the columnar shape within the space of the outside member, can be made thinner as a whole.

Hence, the variable capacitance type capacitor according to the present invention can be easily housed in a thin type casing such as that of a position indicator or the like, and can be readily put into mass production.

Effect of the Invention

According to the present invention, it is possible to realize a variable capacitance type capacitor that can be handled as one device, has a simple construction capable of being made thinner, and has a capacitance corresponding to an externally applied force. Hence, the variable capacitance type capacitor according to the present invention is suitable as a part to be housed in a thin type casing such as that of a position indicator or the like, and can be easily used as a mass-produced part.

BRIEF DESCRIPTION OF THE SEVERAL VIEWS OF THE DRAWINGS

FIGS. 11A, 11B, and 11C are diagrams explaining an internal construction in the example of the position indicator of FIG. 6.

FIGS. 12A, 12B, 12C, 12D, and 12E are diagrams explaining an internal construction in the example of the position indicator of FIG. 6.

DETAILED DESCRIPTION

Embodiments of a variable capacitance type capacitor according to the present invention will hereinafter be described with reference to the drawings.

First Embodiment

Figure 1:
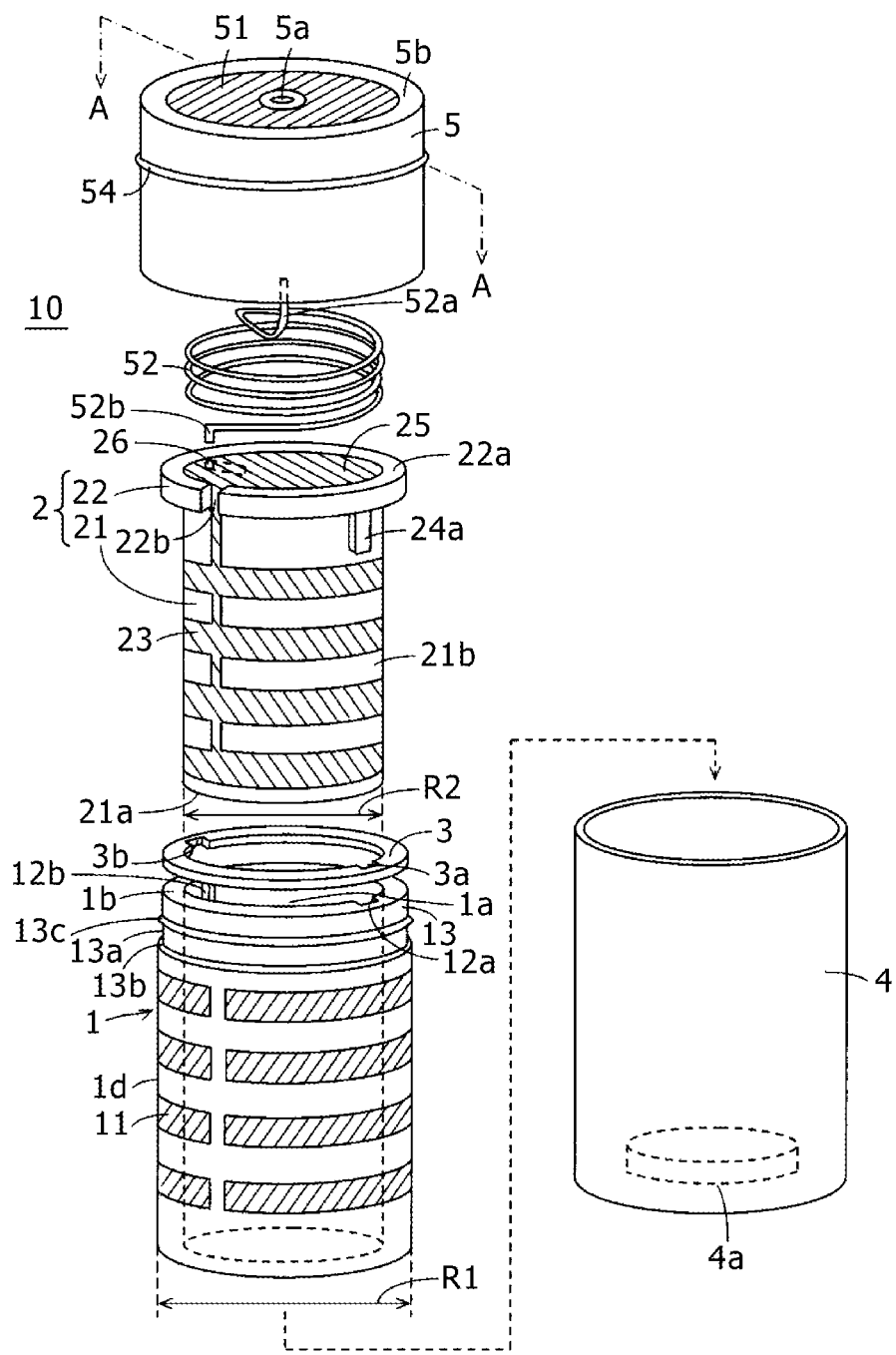
FIG. 1 is an exploded perspective view of an example of construction of a first embodiment of a variable capacitance type capacitor according to the present invention.
Figure 2A:
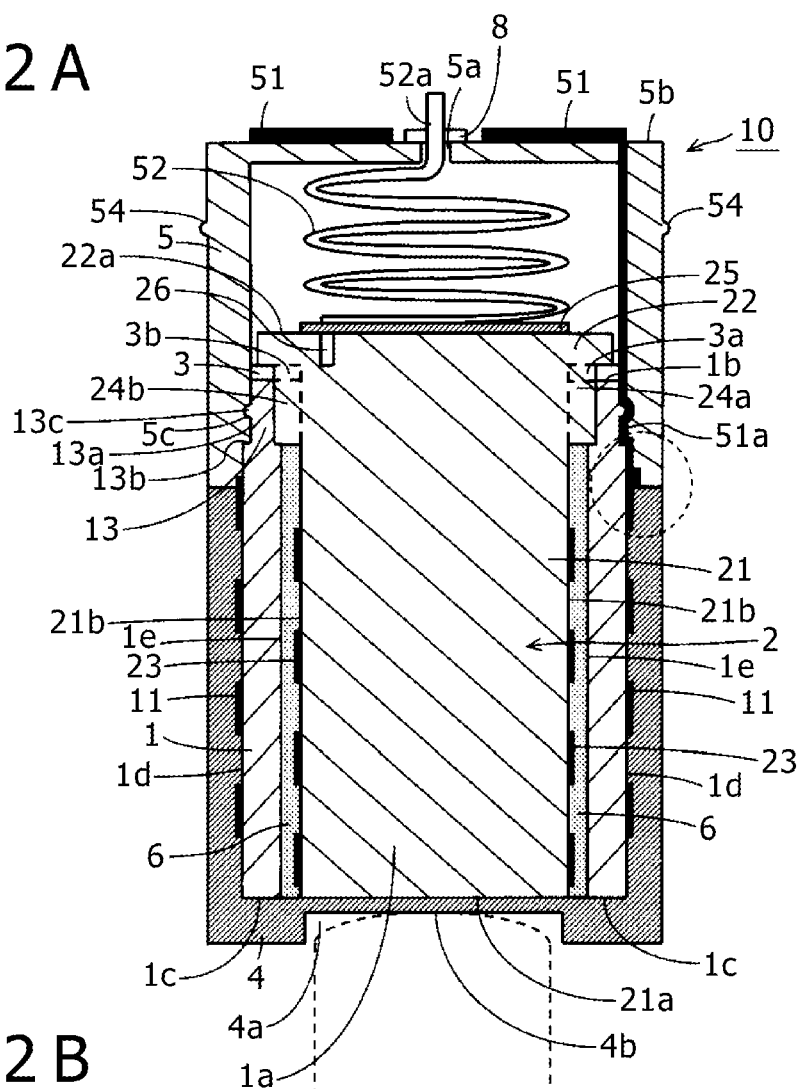
FIGS. 2A and 2B are sectional views of the example of construction of the first embodiment of the variable capacitance type capacitor according to the present invention.
Figure 2B:
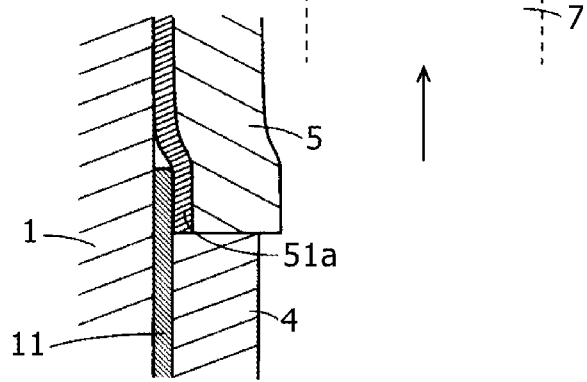

FIG. 1 is an exploded perspective view of a general construction of a first embodiment of a variable capacitance type capacitor according to the present invention. FIG. 2A is a longitudinal sectional view of the first embodiment of the variable capacitance type capacitor according to the present invention (sectional view taken along a line A-A in FIG. 1). FIG. 2B is an enlarged view of a part shown in a circle in FIG. 2A.

As shown in FIG. 1 and FIG. 2A, the variable capacitance type capacitor 10 according to the first embodiment includes an outside member 1 formed by a cylinder having a hollow space 1a, an inside member 2 housed within the hollow space 1a of the outside member 1, a buffering member 3 for buffering provided between the outside member 1 and the inside member 2, a protective case member 4, and a coupling member 5 for leading electrodes.

The outside member 1 is formed of a dielectric material having a predetermined dielectric constant, such as for example glass, ceramic, resin such as PET (polyethylene terephthalate) and the like. The outside member 1 has a hollow cylindrical shape whose outside diameter R1 is for example 3 to 5 mm and whose inside diameter R2 is 2 to 4 mm. In the present example, the outside member 1 is formed of ceramic, and has an opening having the inside diameter R2 at both ends of the outside member 1 in the direction of the central axis of the outside member 1.

The inside member 2 is formed of a dielectric material made of resin such as PET, for example. The inside member 2 has a column-shaped part 21 whose diameter R is slightly smaller than the inside diameter R2 of the outside member 1 (R<R2). The inside member 2 in the present example also has a ring-shaped projecting part (hereinafter referred to as a flange part) 22 that projects radially outward from the peripheral surface (column surface) of the column-shaped part 21 on one end surface side in the direction of the central axis of the column-shaped part 21. In the present example, as shown in FIG. 1 and FIG. 2A, the diameter of the flange part 22 is selected to be smaller than the outside diameter R1 of the outside member 1 and larger than the inside diameter R2 of the outside member 1.

As shown in FIG. 2A, the flange part 22 of the inside member 2 abuts against an end surface 1b on one side of the outside member 1 and plays a role of setting positional relation in the direction of the central axis between the inside member 2 and the outside member 1 when the column-shaped part 21 of the inside member 2 is inserted into the inside of the hollow space 1a of the outside member 1 from one side of the hollow space 1a of the outside member 1. In the present example, the buffering member 3 formed by an elastic body such as for example a rubber in the shape of a ring is inserted between the flange part 22 of the inside member 2 and the end surface 1b on the one side of the outside member 1 to ease the abutment between the flange part 22 of the inside member 2 and the end surface 1b on the one side of the outside member 1.

In the present example, as shown in FIG. 2A, the length in the direction of the central axis of the column-shaped part 21 excluding the thickness of the flange part 22 is selected to be equal to a sum of the length in the direction of the central axis of the outside member 1 and the thickness of the buffering member 3. Thus, in a state in which the inside member 2 is housed within the hollow space 1a of the outside member 1, as shown in FIG. 2A, an end surface 1c on another side in the direction of the central axis of the outside member 1 and an end surface 21a of the column-shaped part 21 of the inside member 2 which is on an opposite side from the side of the flange part 22 are flush with each other. Of course, it is not essential that the end surface 1c on the other side in the direction of the central axis of the outside member 1 and the end surface 21a of the column-shaped part 21 of the inside member 2 which is on the opposite side from the side of the flange part 22 be flush with each other as in the present example. The end surface 21a of the column-shaped part 21 of the inside member 2 which is on the opposite side from the side of the flange part 22 may further project outward from the end surface 1c on the other side in the direction of the central axis of the outside member 1, or may be in a state of being recessed to the inside of the hollow space 1a of the outside member 1.

As shown hatched in FIG. 1, a first conductor pattern (hereinafter referred to as an inside conductor pattern) 23 is formed by for example deposition or the like on a circumferential surface (column surface) 21b of the column-shaped part 21 of the inside member 2. In addition, a second conductor pattern (hereinafter referred to as an outside conductor pattern) 11 is formed by deposition or the like on an outer circumferential surface 1d of the outside member 1 in such a manner as to correspond to the inside conductor pattern 23 of the inside member 2 housed within the hollow space 1a.

Figure 3A:
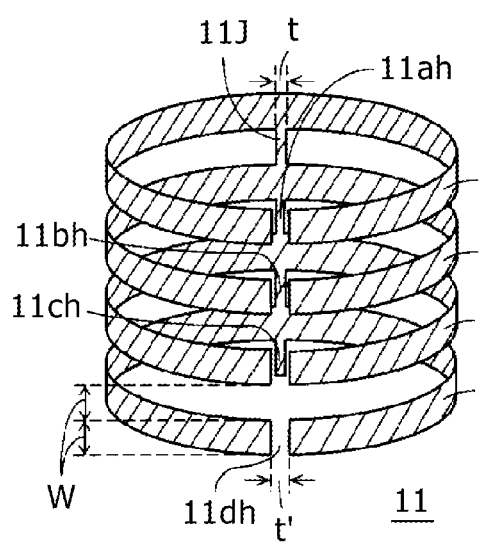
FIGS. 3A and 3B are diagrams showing an example of an outside conductor pattern and an inside conductor pattern in the first embodiment of the variable capacitance type capacitor according to the present invention.
Figure 3B:
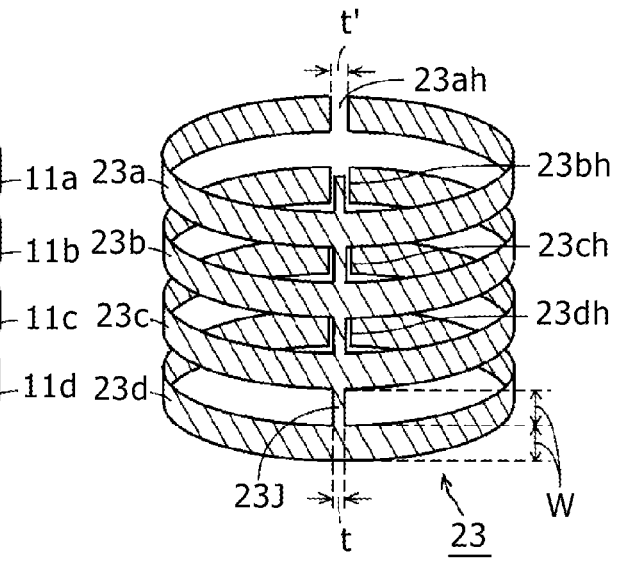

FIGS. 3A and 3B show an example of the pattern shapes of the outside conductor pattern 11 and the inside conductor pattern 23. FIG. 3A shows an example of the outside conductor pattern 11. FIG. 3B shows an example of the inside conductor pattern 23.

As shown in FIG. 3B, the inside conductor pattern 23 includes one or a plurality of ring-shaped conductor patterns, or four ring-shaped conductor patterns 23a, 23b, 23c, and 23d in the present example, the conductor patterns being formed on the circumferential surface of the column-shaped part 21 to extend in a direction intersecting the direction of the central axis of the column-shaped part 21 of the inside member 2, or in a direction orthogonal to the direction of the central axis in the present example, and the plurality of conductor patterns 23a to 23d are arranged along the direction of the central axis. The conductor patterns 23a to 23d in the present example each have a width W in the direction of the central axis of the inside member 2, and are formed in a state of being separated from each other by an interval W in the direction of the central axis. In this case, W=200 µm, for example.

The plurality of ring-shaped conductor patterns 23a to 23d have a shape formed by providing a gap to a ring, and openings 23ah to 23dh as the gaps of the conductor patterns 23a to 23d are formed so as to be arranged in a column in the direction of the central axis of the column-shaped part 21 of the inside member 2. Further, the plurality of ring-shaped conductor patterns 23a to 23d are coupled to each other by a connecting pattern 23J in the direction of the central axis of the column-shaped part 21 of the inside member 2. The width in a circumferential direction of the connecting pattern 23J is t, and the length (opening width) in the circumferential direction of the openings 23ah to 23dh is t'. In this case, the length t' is slightly larger than the width t.

On the other hand, as shown in FIG. 3A, the outside conductor pattern 11 has a shape such as is obtained by turning the inside conductor pattern 23 of FIG. 3B upside down in the direction of the central axis. However, the outside conductor pattern 11 is different from the inside conductor pattern 23 in that the outside conductor pattern 11 is formed on the outer circumferential surface of the outside member 1, and has a diameter larger than the column-shaped part 21 of the inside member 2. The outside conductor pattern 11 and the inside conductor pattern 23 in the present example are of a comb type shape and are thus similar, but are of shapes such that the outside and inside conductor patterns 11 and 23 can be combined without having the teeth of the comb of the outside conductor pattern 11 oppose the teeth of the comb of the inside conductor pattern 23.

Specifically, the outside conductor pattern 11 includes a plurality of ring-shaped conductor patterns 11a to 11d formed on the circumferential surface of the outside member 1 to extend in a direction of intersecting the direction of the central axis of the outside member 1, or in a direction orthogonal to the direction of the central axis in the present example, and the plurality of conductor patterns 11a to 11d are arranged along the direction of the central axis. The conductor patterns 11a to 11d each have the width W in the direction of the central axis, and are formed in a state of being separated from each other by the interval W in the direction of the central axis.

The plurality of ring-shaped conductor patterns 11a to 11d have openings 11ah to 11dh formed so as to be arranged in a column in the direction of the central axis of the outside member 1, and are coupled to each other by a connecting pattern 11J in the direction of the central axis of the outside member 1. The width in a circumferential direction of the connecting pattern 11J is t, and the length in the circumferential direction of the openings 11ah to 11dh is t'.

In addition, in the present example, the connecting pattern 11J is formed at a position on the outer circumferential surface of the outside member 1, which position is separated from the openings 11ah to 11dh of the ring-shaped conductor patterns 11a to 11d by 180 degrees.

Figure 4A:
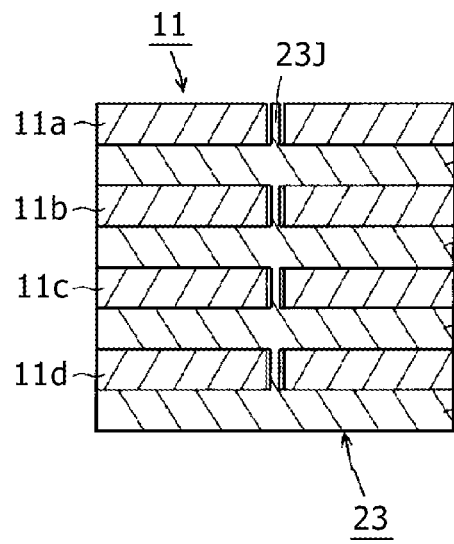
FIGS. 4A and 4B are diagrams explaining a state in which the outside conductor pattern and the inside conductor pattern in the first embodiment of the variable capacitance type capacitor according to the present invention are opposed to each other.

In the present example, as shown in FIG. 4A, when the inside member 2 is housed within the hollow space 1a of the outside member 1 and no pressure is applied, the ring-shaped conductor patterns 23a to 23d of the inside conductor pattern 23 are opposed to regions in which no conductor patterns are formed between the ring-shaped conductor patterns 11a to 11d of the outside conductor pattern 11. In addition, the connecting pattern 23J of the inside conductor pattern 23 is disposed so as to be opposed to the positions of the openings 11ah to 11dh of the outside conductor pattern 11. Similarly, the connecting pattern 11J of the outside conductor pattern 11 is disposed so as to be opposed to the positions of the openings 23ah to 23dh of the inside conductor pattern 23.

In this case, the positions of the ring-shaped conductor patterns 11a to 11d and 23a to 23d in the direction of the central axis of the outside member 1 and the inside member 2 can be set by the abutment of the flange part 22 of the inside member 2 against the end surface 1b of the outside member 1. On the other hand, the outside member 1 and the inside member 2 have an engaging part for alignment in corresponding positional relation in the circumferential direction between the connecting pattern 11J and the openings 23ah to 23dh and corresponding positional relation in the circumferential direction between the connecting pattern 23J and the openings 11ah to 11dh.

Specifically, in the present example, as shown in FIGS. 1 and 2A, engaging projections 24a and 24b are provided on the circumferential surface of the column-shaped part of the inside member 2 and directly under a surface of the flange part 22 abutting against the end surface 1b of the outside member 1. In the present example, the engaging projections 24a and 24b are provided at positions separated from each other by 180 degrees and each separated from the position of formation of the connecting pattern 23J of the inside conductor pattern 23 by 90 degrees.

On the other hand, engaging depression grooves 12a and 12b to be engaged with the engaging projections 24a and 24b are provided in an inner circumferential surface of the outside member 1 in the vicinity of the end surface 1b. In this case, the engaging depression grooves 12a and 12b are formed at positions such that the connecting pattern 11J of the outside conductor pattern 11 is opposed to the openings 23ah to 23dh of the inside conductor and the connecting pattern 23J of the inside conductor pattern 23 is opposed to the openings 11ah to 11dh of the outside conductor pattern 11 when the engaging depression grooves 12a and 12b are engaged with the engaging projections 24a and 24b. In the present example, the engaging depression grooves 12a and 12b are each provided at a position separated from the position of formation of the connecting pattern 11J of the outside conductor pattern 11 by 90 degrees.

In addition, the buffering member 3 has notch grooves 3a and 3b formed at positions separated from each other by 180 degrees, through which the engaging projections 24a and 24b pass when the engaging projections 24a and 24b are engaged with the engaging depression grooves 12a and 12b.

Because of the construction as described above, when the column-shaped part 21 of the inside member 2 is inserted into the inside of the hollow space 1a of the outside member 1 while the positions in the circumferential direction of the engaging projections 24a and 24b of the inside member 2 are set such that the engaging projections 24a and 24b of the inside member 2 are passed through the notch grooves 3a and 3b of the buffering member 3 and inserted and fitted into the engaging depression grooves 12a and 12b of the outside member 1, the inside conductor pattern 23 and the outside conductor pattern 11 are arranged so as to oppose each other as a whole in a radial direction while not overlapping each other as viewed in a direction orthogonal to the circumferential surface, as shown in FIG. 4A.

While there may be one set of an engaging projection and an engaging depression groove as an example of the engaging part for positioning of the inside member 2 and the outside member 1 in the circumferential direction, the engaging part for the positioning of the inside member 2 and the outside member 1 in the circumferential direction in the present example includes two sets of the engaging projections 24a and 24b and the engaging depression grooves 12a and 12b disposed at different positions in the circumferential direction. Therefore, the position of the central axis of the inside member 2 and the position of the central axis of the outside member 1 can be positioned at the same time by the engagement of the engaging projections 24a and 24b and the engaging depression grooves 12a and 12b. There may of course be three or more sets as the engaging part for the positioning of the inside member 2 and the outside member 1 in the circumferential direction.

While there are four ring-shaped conductor patterns in each of the examples of FIGS. 3A and 3B, this is an example for description. A larger number of ring-shaped conductor patterns, for example, about 50 ring-shaped conductor patterns may be formed in the direction of the central axis of the outside member 1 and the inside member 2. In addition, the positional relation in the direction of the central axis between the outside conductor pattern 11 and the inside conductor pattern 23 may be set such that the outside conductor pattern 11 and the inside conductor pattern 23 oppose each other when no pressure is applied.

The outside conductor pattern 11 in the shape as described above is formed on the outer circumferential surface 1d. As shown in FIG. 1, a part of the outside member 1, which is closest to the end surface 1b and in which the outside conductor pattern 11 is not formed, is a coupling part 13 for coupling to the coupling member 5. The coupling part 13 of the outside member 1 has a diameter smaller than the outside diameter R1 of the outside member 1. There is thus a step part 13b formed between an outer circumferential surface 13a of the coupling part 13 and the outer circumferential surface 1d on which the outside conductor pattern 11 is formed. A ring-shaped projection part 13c to be fitted into a ring-shaped depression part 5c, which will be described later, of the coupling member 5 is formed on the outer circumferential surface 13a of the coupling part 13.

The outside member 1 having the outside conductor pattern 11 in the shape as described above formed on the outer circumferential surface 1d is housed within the protective case member 4 to be protected so that most of the outside conductor pattern 11 is not exposed to the outside. As shown in FIG. 2A, the protective case member 4 is a hollow and bottomed cylindrical cup-shaped member having an inside diameter substantially equal to or slightly larger than the outside diameter of the outside member 1, and is formed by a resin or the like having an elastic bottom part formed in the shape of a thin film, for example.

Incidentally, not all of the outside member 1 is covered by the protective case member 4. The coupling part 13 to be coupled with the coupling member 5 to be described later and a part close to the end surface 1b are not covered by the protective case member 4. That is, the length in the direction of the central axis of the protective case member 4 is such that the part close to the end surface 1b of the outside member 1 is exposed to the outside. As will be described later, the part exposed to the outside allows the outside conductor pattern 11 to be electrically connected to a conductor pattern formed on the coupling member 5 and thus connected to a second electrode.

A circular depression part 4a having a diameter smaller than the diameter of the column-shaped part 21 of the inside member 2 is formed in the outside of the bottom part of the protective case member 4. A circular part on which the circular depression part 4a of the bottom part of the protective case member 4 is formed is a thin wall part 4b. The protective case member 4 is formed of a resin having elasticity. When the thin wall part 4b is pressed from a direction indicated by an arrow in FIG. 2A, the thin wall part 4b can be bent and displaced to the inside. As shown in FIG. 2A, when the column-shaped part 21 of the inside member 2 is housed within the hollow space 1a of the outside member 1 and no pressure is applied, the end surface 21a of the column-shaped part 21 abuts against the thin wall part 4b.

The outside member 1 having the outside conductor pattern 11 as described above formed on the outer circumferential surface 1d is housed within the protective case member 4, and for example the outer circumferential surface 1d and the other end surface 1c of the outside member 1 are respectively bonded and fixed to an inner wall surface and a circumferential part of a bottom surface of the protective case member 4 by an adhesive.

In the present example, a gap formed between an inner circumferential surface 1e of the outside member 1 and the circumferential surface 21b of the column-shaped part 21 of the inside member 2 is filled with a high dielectric constant liquid 6, for example a silicone oil. When the high dielectric constant liquid 6 is filled between the inner circumferential surface 1e of the outside member 1 and the circumferential surface 21b of the column-shaped part 21 of the inside member 2, the inside conductor pattern 23 formed on the circumferential surface 21b of the column-shaped part 21 of the inside member 2 can be protected from humidity, and temporal degradation of the capacitor can be suppressed. In addition, the performance of the capacitor for possessing a high dielectric constant can be improved.

Description will next be made of a structure of the variable capacitance type capacitor 10 according to the first embodiment, which is provided to lead electrodes for connection to an external device.

One electrode (first electrode) of the variable capacitance type capacitor 10 according to the first embodiment is connected to the inside conductor pattern 23 formed on the circumferential surface 21b of the column-shaped part 21 of the inside member 2, and another electrode (second electrode) of the variable capacitance type capacitor 10 is connected to the outside conductor pattern 11 formed on the outer circumferential surface 1d of the outside member 1.

As shown in FIG. 1 and FIG. 2A, an electrode coupling conductor pattern 25 for connecting the first electrode and the inside conductor pattern 23 to each other is formed on a top surface 22a of the flange part 22 of the inside member 2. A notch part 22b is provided at a position corresponding to the position of formation of the connecting pattern 23J of the inside conductor pattern 23 in the circumferential direction of the flange part 22 of the inside member 2. Then, a conductor pattern is formed from the connecting pattern 23J of the inside conductor pattern 23 formed on the column-shaped part 21 of the inside member 2 through the notch part 22b to the electrode coupling conductor pattern 25. The inside conductor pattern 23 and the electrode coupling conductor pattern 25 are thereby electrically connected to each other.

The coupling member 5 is formed of a resin, for example, and has the shape of a cap in which an upper part of a cylindrical hollow space is closed. The inside diameter of the cylindrical hollow space of the coupling member 5 is selected to be the same as or slightly smaller than the outside diameter of the coupling part 13 of the outside member 1 (diameter of the outer circumferential surface 13a). As described above, a ring-shaped depression part 5c (FIG. 2A), into which the ring-shaped projection part 13c formed on the coupling part 13 of the outside member 1 is fitted, is formed in an inner wall surface forming the cylindrical hollow space of the coupling member 5. The ring-shaped depression part 5c is formed at a position such that an end surface on an opening side of the coupling member 5 precisely abuts against an end surface of the protective case member 4 housing the outside member 1 when the coupling member 5 is engaged with the outside member 1.

A through hole 5a for leading the first electrode is formed at a center of the upper part of the coupling member 5. A coil spring 52 formed of a conductive material, for example an elastic conductor is disposed within the cylindrical hollow space of the coupling member 5. One end part 52a of the coil spring 52 has the shape of a projection, and is led out as a central conductor through the through hole 5a, as shown in FIG. 2A. As shown in FIG. 2A, a ring-shaped washer 8 having an inside diameter substantially equal to the diameter of the coil spring 52 is press-fitted to the one end part 52a of the coil spring 52 led out through the through hole 5a. Thereby, the one end part 52a of the coil spring 52 is locked in such a manner as to project from the coupling member 5.

Another end 52b of the coil spring 52 formed of an elastic conductor is inserted into a depression hole 26 (see FIG. 1 and FIG. 2A) including a conductor formed on an inner wall thereof, the depression hole 26 being provided within the region of the electrode coupling conductor pattern 25 formed on the top surface 22a of the flange part 22 of the inside member 2. The coil spring 52 having elasticity in the direction of the central axis is thereby electrically connected to the inside conductor pattern 23, via abutment against a flat surface part forming the electrode coupling conductor pattern 25 or via coupling to the depression hole 26. One end 52a of the coil spring 52 which is led out to the outside through the through hole 5a thereby constitutes the first electrode connected to the inside conductor pattern 23. In this case, the one end 52a of the coil spring 52 constitutes the central conductor projecting in the shape of a projection from the through hole 5a at a center of a surface 5b of the upper part of the coupling member 5.

In addition, a conductor metal 51 is formed as the second electrode on the surface 5b of the upper part of the coupling member 5, the conductor metal 51 being a peripheral conductor disposed on the periphery of the one end 52a of the coil spring 52 as the central conductor projecting in the shape of a projection from the center of the surface 5b, that is, the conductor metal 51 being formed in the shape of a doughnut so as to be separated from the through hole 5a by a predetermined distance and thus electrically disconnected from the central conductor. As shown in the sectional view of FIG. 2A, the conductor metal 51 includes an extending part 51a formed by insert molding, the extending part 51a penetrating the upper part of the coupling member 5 and extending to the inner wall surface of the coupling member 5, and further extending to the opening end side of the coupling member 5.

The coupling member 5 formed as described above is engaged with the outside member 1 such that the opening side of the cylindrical hollow space is put on, from the end surface 1b of the outside member 1 housing the column-shaped part 21 of the inside member 2. At this time, because the coupling member 5 is formed of a resin having elasticity or the like, the inner wall surface at the end on the opening side goes over the ring-shaped projection part 13c of the coupling part 13 of the outside member 1, and advances to a position at which the end surface on the opening side of the coupling member 5 abuts against the end surface of the protective case member 4. When the end surface on the opening side of the coupling member 5 comes to the position at which the end surface on the opening side of the coupling member 5 abuts against the end surface of the protective case member 4, the ring-shaped projection part 13c is fitted into the ring-shaped depression part 5c. The coupling member 5 is thereby locked to the outside member 1. In this state, as shown in FIG. 2B, which is an enlarged view of the part enclosed by the circle in FIG. 2A, the extending part 51a of the conductor metal 51 led out to the opening end surface of the coupling member 5 is elastically brought into pressure contact with the outside conductor pattern 11 on the outside member 1, whereby the conductor metal 51 forming the second electrode is electrically connected to the outside conductor pattern 11.

Then, the opening side end surface of the coupling member 5 and the end surface of the protective case member 4 on the side of the end surface 1b of the outside member 1 are bonded to each other by an adhesive, for example, so that the entire capacitor is sealed.

In addition, in the present example, a ring-shaped projection part 54 to be fitted into a depression groove formed in a coupling adapter 140 to be described later when the coupling member 5 is fitted into the coupling adapter 140 is formed on the outer circumferential surface of the coupling member 5.

The variable capacitance type capacitor 10 according to the first embodiment which is formed as described above changes its capacitance according to a pressing force applied to the thin wall part 4b of the bottom part of the protective case member 4 by a pressing member 7 as shown by a dotted line in FIG. 2A in the direction of the central axis of the column-shaped part 21 of the inside member 2, as indicated by an arrow.

Specifically, in a state in which no pressing force is applied to the thin wall part 4b of the bottom part of the protective case member 4 in the direction of the central axis of the column-shaped part 21 of the inside member 2 in the variable capacitance type capacitor 10 according to the first embodiment, as shown in FIG. 4A, the inside conductor pattern 23 and the outside conductor pattern 11 do not form common (overlapping) regions therebetween in which the inside conductor pattern 23 and the outside conductor pattern 11 are opposed to each other with the outside member 1 and the high dielectric constant liquid 6 interposed between the inside conductor pattern 23 and the outside conductor pattern 11.

Figure 4B:
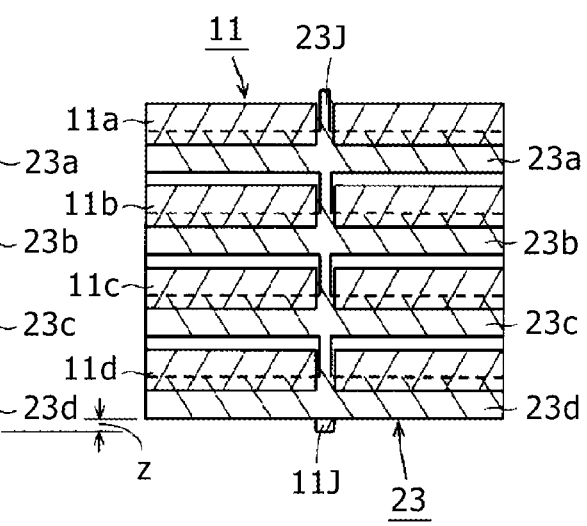

When the pressing member 7 applies a pressing force as indicated by the arrow from this state to the thin wall part 4b of the bottom part of the protective case member 4 in the direction of the central axis of the column-shaped part 21 of the inside member 2, the inside member 2 is displaced in the direction of the central axis by a distance z corresponding to the pressing force relative to the outside member 1 against an elastic displacement force of the coil spring 52. Then, as shown in FIG. 4B, the inside conductor pattern 23 and the outside conductor pattern 11 form common regions in which the inside conductor pattern 23 and the outside conductor pattern 11 are opposed to each other with the outside member 1 and the high dielectric constant liquid 6 interposed between the inside conductor pattern 23 and the outside conductor pattern 11. The area of the common regions corresponds to the pressing force of the pressing member 7.

Specifically, letting the radius of the column-shaped part 21 of the inside member 2 be r, when the pressing force displaces the inside member 2 in the direction of the central axis by the distance z, the common regions formed between the inside conductor pattern 23 and the outside conductor pattern 11, that is, the opposed area S in which the inside conductor pattern 23 and the outside conductor pattern 11 are opposed to each other is approximately as follows.

$$S = (2\pi r - t') \times z \times (\text{Number of Ring-Shaped Conductor Patterns})$$

The opposed area S corresponds to the displacement distance z of the inside member 2, the displacement distance z corresponding to the pressing force.

Letting $\in$ be the dielectric constant of the high dielectric constant liquid 6, and letting d be a distance between the outer circumferential surface 21b of the column-shaped part 21 of the inside member 2 and the inner circumferential surface 1e of the outside member 1, the capacitance C of the variable capacitance type capacitor 10 is $$C = A \times \in \times (S/d) \text{ (where } A \text{ is a constant)}$$

The capacitance C, which changes according to the pressing force of the pressing member 7, is therefore obtained between the first electrode (one end 52a of the coil spring 52) and the second electrode (conductor metal 51) of the variable capacitance type capacitor 10. In addition, the magnitude of the change in capacitance depends on the number of conductor patterns formed in the shape of a ring.

In the present example, as described above, the ring-shaped conductor patterns 23a to 23d and 11a to 11d of the width W of the inside conductor pattern 23 and the outside conductor pattern 11 are both formed at the same intervals W in the direction of the central axis, and W=200 μm. A maximum value of the distance z of the displacement by the pressing force of the pressing member 7 is therefore z=200 μm.

In the above-described embodiment, description has been made of a case where the ring-shaped conductor patterns 23a to 23d and 11a to 11d of the width W of the inside conductor pattern 23 and the outside conductor pattern 11 are both formed at the same intervals W in the direction of the central axis of the outside member 1 and the inside member 2. However, as shown in FIG. 5, intervals W2 of the ring-shaped conductor patterns 23a to 23d and the conductor patterns 11a to 11d that are adjacent to each other in the direction of the central axis of the outside member 1 and the inside member 2 may be wider than a width W1 of the ring-shaped conductor patterns 23a to 23d and the conductor patterns 11a to 11d.

Figure 5:
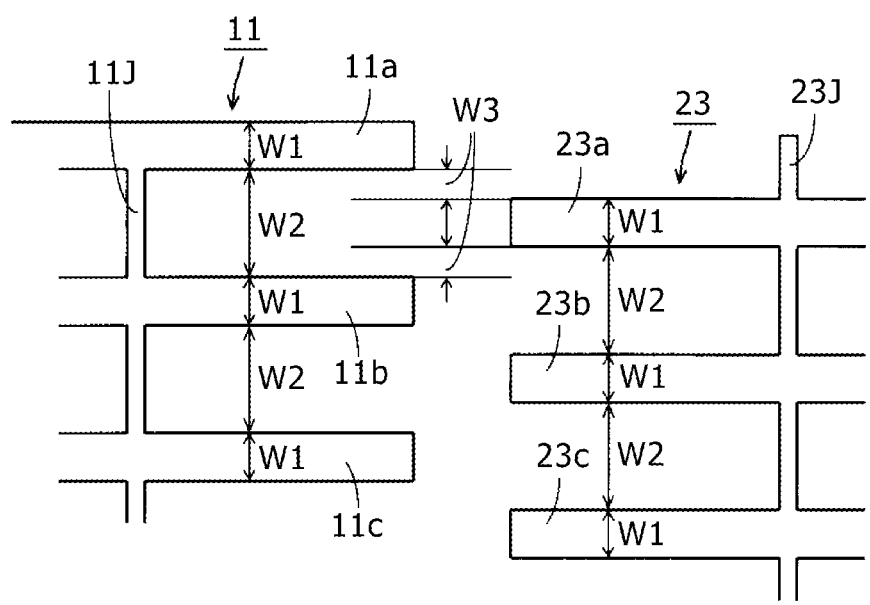
FIG. 5 is a diagram explaining an example of the outside conductor pattern and the inside conductor pattern in the first embodiment of the variable capacitance type capacitor according to the present invention.

For example, the example of FIG. 5 represents the positional relation of the conductor patterns when no pressure is applied, with W1=200 μm, W2=400 μm, and W3=100 μm. In the case of FIG. 5, when the displacement distance z of the inside member 2 due to the pressing force of the pressing member 7 is less than 100 μm, the variable capacitance type capacitor 10 does not greatly change in capacitance. When the displacement distance z of the inside member 2 due to the pressing force of the pressing member 7 becomes equal to or greater than 100 μm, the inside conductor pattern 23 and the outside conductor pattern 11 form regions (area) therebetween in which the inside conductor pattern 23 and the outside conductor pattern 11 are opposed to each other, and the variable capacitance type capacitor 10 changes its capacitance according to the distance z. In that case, the length in the direction of the central axis of the column-shaped part 21 of the inside member 2 of the variable capacitance type capacitor according to the first embodiment is about 3 cm when the number of ring-shaped conductor patterns of the inside conductor pattern 23 is 50, for example.

[Example of Position Indicator as Example of Electronic Device Using Variable Capacitance Type Capacitor according to Embodiment]

Figure 6:
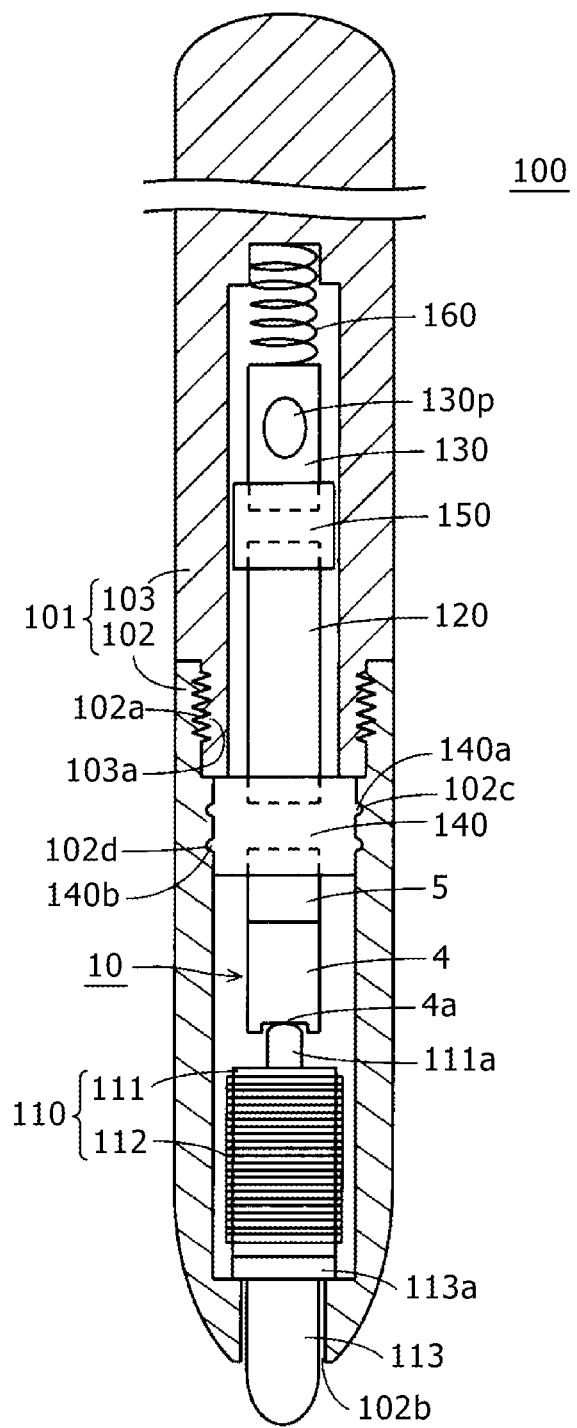
FIG. 6 is a diagram showing an example of construction of a position indicator as an example of an electronic device using the first embodiment of the variable capacitance type capacitor according to the present invention.

FIG. 6 shows an example of construction of a position indicator 100 using the variable capacitance type capacitor 10 according to the first embodiment described above for pen pressure detection. The position indicator 100 in the example of FIG. 6 is an example of a position indicator to be used in conjunction with a position detecting device of an electromagnetic induction system, and has a construction in which the variable capacitance type capacitor 10 according to the first embodiment described above is used as a part of a capacitor forming a resonance circuit. That is, the position indicator 100 converts pen pressure into a change in resonance frequency, which corresponds to a change in capacitance of the capacitor forming the resonance circuit in conjunction with a coil. FIG. 6 shows a case in cross-section in order to facilitate description of the construction of the position indicator 100 within an outer casing (case).

As shown in FIG. 6, the case 101 of the position indicator 100 in the present example includes a first case 102 and a second case 103 in the shape of a hollow cylinder, and has a construction in which the first case 102 and the second case 103 are fitted to each other concentrically. In the present example, the first case 102 and the second case 103 include threaded parts 102a and 103a, and are coupled to each other by screwing the threaded part 103a of the second case 103 into the threaded part 102a of the first case 102. An opposite side of the first case 102 from the side coupled to the second case 103 is a pen point side of the position indicator 100 in the shape of a pen, and is provided with an opening 102b.

The position indicator 100 in the present example includes, within the hollow part of the case 101, an inductance member 110 forming a resonance circuit for electromagnetic coupling, a variable capacitance type capacitor 10 as a pen pressure detecting member also forming the resonance circuit, a capacitor 120 also forming the resonance circuit for adjusting the resonance frequency, and a push switch 130, arranged and housed in this order in the direction of the central axis of the case 101, as shown in FIG. 6.

The inductance member 110 is formed by winding a coil 112 as an inductance element around a ferrite core 111 as an example of a magnetic substance. In the present example, a core body 113 is provided in a state of being coupled to one end side of the ferrite core 111. The core body 113 is coupled to the ferrite core 111 by joining a flange part 113a of the core body 113 to an end part of the ferrite core 111. The flange part 113a of the core body 113 is engaged with a stepped part on the side of the opening 102b of the first case 102 of the case 101 so that the core body 113 is prevented from being detached from the case 101.

In the present example, as shown in FIG. 6, the ferrite core 111 includes a rod-shaped projection part 111a on an opposite side from the side coupled to the core body 113 in the direction of the central axis of the ferrite core 111, the rod-shaped projection part 111a having such a diameter as to allow the rod-shaped projection part 111a to be fitted into the depression part 4a provided in the bottom part of the protective case member 4 of the variable capacitance type capacitor 10, and having an end thereof formed in the shape of a dome. As shown in FIG. 6, the rod-shaped projection part 111a of the ferrite core 111 is disposed so as to be fitted into the circular depression part 4a provided in the bottom part of the protective case member 4 of the variable capacitance type capacitor 10. The rod-shaped projection part 111a of the ferrite core 111 therefore functions as a pressing member for pressing the column-shaped part 21 of the inside member 2 of the variable capacitance type capacitor 10 through the thin wall part 4b of the bottom part of the protective case member 4.

The variable capacitance type capacitor 10 is coupled to the capacitor 120 for adjusting the resonance frequency by a coupling adapter 140. The coupling adapter 140 mechanically couples the variable capacitance type capacitor 10 and the capacitor 120 to each other in the direction of the central axis, and electrically connects the variable capacitance type capacitor 10 and the capacitor 120 to each other. Ring-shaped projection parts 140a and 140b are formed on the circumferential surface of the coupling adapter 140, and are engaged with depression grooves 102c and 102d, respectively, formed in the first case 102 of the case 101 when the coupling adapter 140 is press-fitted from the side of the threaded part 102a. The coupling adapter 140 and the first case 102 are thereby fixed to each other.

The capacitor 120 for adjusting the resonance frequency, which is used in the position indicator 100 in the present example, is a rod-shaped capacitor, and has a construction as shown in FIGS. 7A to 10.

The capacitor 120 is a film capacitor. The capacitor 120 is formed in the shape of a rod as shown in FIG. 10 by winding, as shown in FIG. 9, a film capacitor 204 shown in FIGS. 7A to 7C and an insulating film 205 shown in FIG. 8. The film capacitor 204 has a first conductor layer 202 and a second conductor layer 203 formed on the front side and the back side of a dielectric film 201 by deposition or the like in such a manner as to be opposed to each other with the dielectric film 201 interposed between the first conductor layer 202 and the second conductor layer 203. In the example of FIG. 9, a lateral direction of the dielectric film 201 that is longer in the horizontal direction (see FIG. 8) is an axial core direction of the winding, and a longitudinal direction of the dielectric film 201 is a winding direction. However, this is for the convenience of description. For example, the lateral direction of the dielectric film 201 that is longer in the vertical direction may of course be set as the axial core direction of the winding.

The dielectric film 201 and the insulating film 205 are formed of a dielectric such as for example PET, polypropylene, polyethylene naphthalate, polyphenylene sulfide, or polycarbonate. The first conductor layer 202 and the second conductor layer 203 are formed by a metallic layer such as for example aluminum, zinc, or an alloy thereof, and are formed on the dielectric film 201 by metal deposition.

Figure 7A:
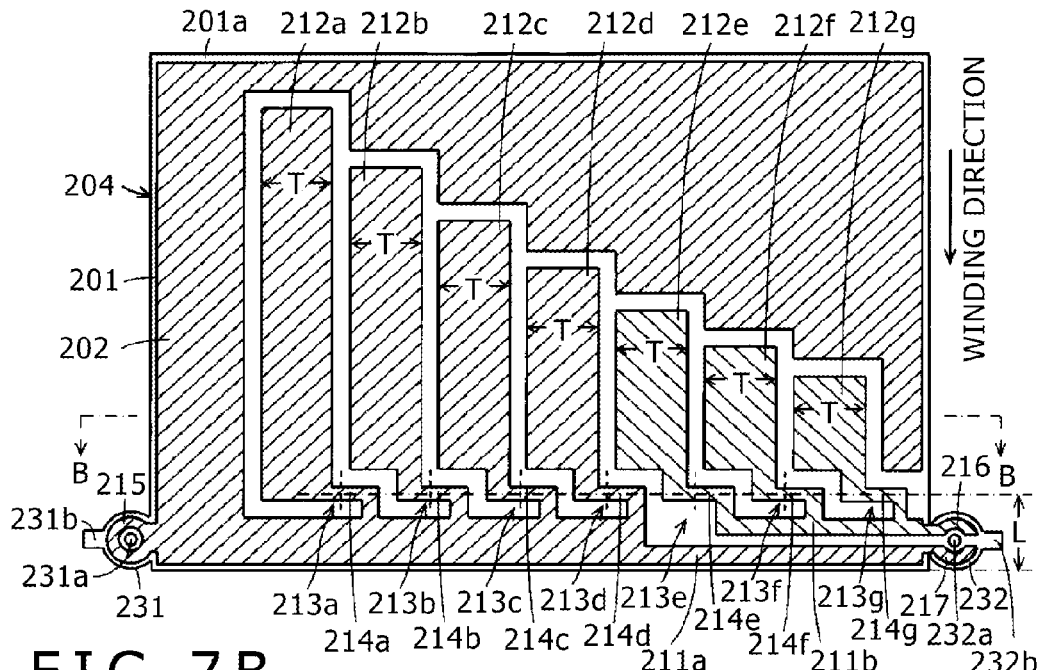
FIGS. 7A, 7B, and 7C are diagrams explaining an example of a rod-shaped capacitor used in the example of the position indicator of FIG. 6.
Figure 7B:
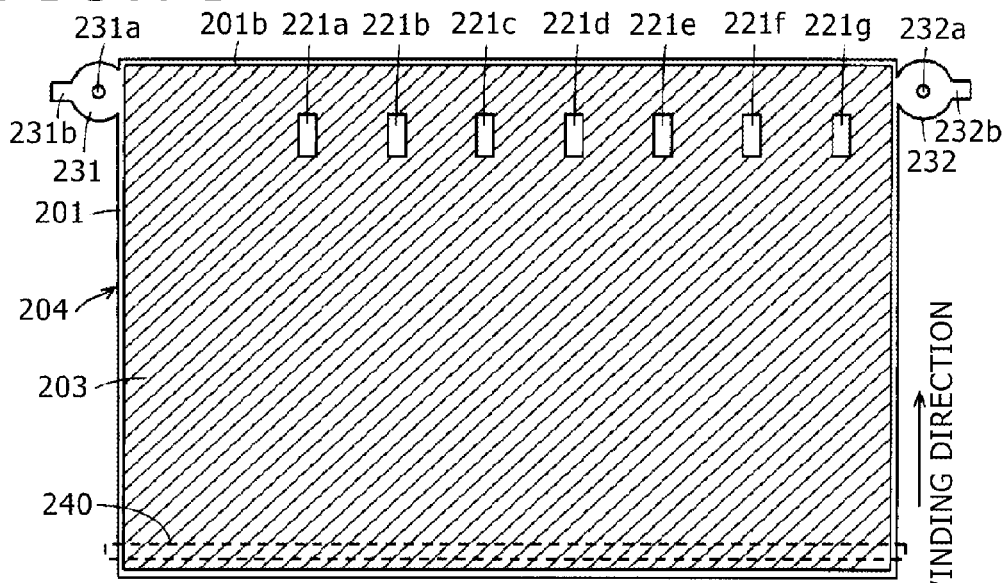
Figure 7C:
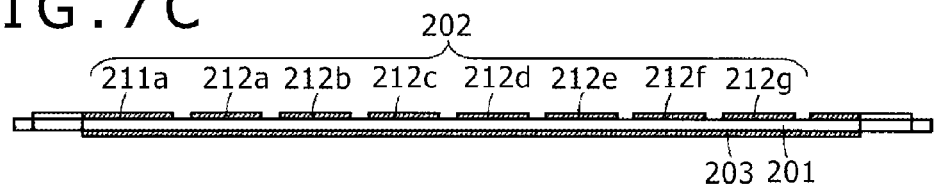

FIG. 7B shows the side of a back surface 201b of the dielectric film 201. The second conductor layer 203 is formed over substantially the entire back surface 201b of the dielectric film 201. FIG. 7A shows the side of a front surface 201a of the dielectric film 201. As will be described later, the first conductor layer 202 is formed on the front surface 201a of the dielectric film 201, the first conductor layer 202 being formed of a conductor pattern whose conductor area can be changed by being subjected to a physical process from the outside, such as a conductor pattern severing process, a conductor pattern joining process, and the like. Therefore, the film capacitor 204 formed by opposing the first conductor layer 202 and the second conductor layer 203 to each other with the dielectric film 201 interposed between the first conductor layer 202 and the second conductor layer 203 has a capacitance corresponding to the conductor area of, for example, the first conductor layer 202, which is changed by being subjected to a physical process from the outside, such as a severing process in the following example. FIG. 7B shows the dielectric film 201 in FIG. 7A turned upside down by inverting an upper end and a lower end of the dielectric film 201. A left end and a right end of the dielectric film 201 in FIG. 7A coincide with those in FIG. 7B.

In the present example, as shown in FIG. 7A, the conductor pattern of the first conductor layer 202 includes: a first and a second common conductor patterns 211a and 211b; one or more capacitance forming conductor patterns, or seven capacitance forming conductor patterns 212a, 212b, 212c, 212d, 212e, 212f, and 212g in the present example; and conductor area changing conductor patterns 213a, 213b, 213c, 213d, 213e, 213f, and 213g, which correspond in number to the number of capacitance forming conductor patterns 212a to 212g.

The conductor area changing conductor patterns 213a to 213g are formed between the first common conductor pattern 211a or the second common conductor pattern 211b and the capacitance forming conductor patterns 212a to 212g, respectively. The conductor area changing conductor patterns 213a to 213g are formed in a position as an outermost circumferential surface side of the wound part of the rod-shaped capacitor 120 so as to be able to be subjected to a subsequent physical process in the rod-shaped capacitor 120.

In the present example, the conductor area changing conductor patterns 213a to 213g respectively include axially disposed conductor patterns 214a, 214b, 214c, 214d, 214e, 214f, and 214g extending in the axial core direction of the capacitor 120 to be wound and formed into the shape of a rod. As indicated by dotted lines in FIG. 7A, the axially disposed conductor patterns 214a to 214g in the rod-shaped capacitor 120 are physically severed subsequently in (along) a direction orthogonal to the extending direction of the axially disposed conductor patterns 214a to 214g (i.e., circumferential direction of the capacitor 120). The first common conductor pattern 211a or the second common conductor pattern 211b and the capacitance forming conductor patterns 212a to 212g are thereby electrically disconnected from each other. It is thus possible to change the conductor area of the first conductor layer 202 forming the capacitance of the capacitor 120.

In the present example, as shown in FIG. 7A, the axially disposed conductor patterns 214a to 214g of the conductor area changing conductor patterns 213a to 213g are disposed so as to be arranged in a row and at equal intervals in the lateral direction of the dielectric film 201 (which lateral direction is the axial core direction of the capacitor 120) in a position separated by a predetermined distance L from a winding end edge in the winding direction of the dielectric film 201. As a result, the axially disposed conductor patterns 214a to 214g of the conductor area changing conductor patterns 213a to 213g in the rod-shaped capacitor 120 are disposed so as to be arranged in a row in the axial core direction of the capacitor 120 in the same position in the circumferential direction of the capacitor 120. In this case, letting r be the radius of the capacitor 120 in the present example which capacitor is wound in the shape of a rod as shown in FIG. 10, the predetermined distance L is selected to be L<2πr, and all of the axially disposed conductor patterns 214a to 214g are positioned in the outermost circumferential part of the rod-shaped capacitor 120.

Further, in the present example, the axially disposed conductor patterns 214a to 214g of the conductor area changing conductor patterns 213a to 213g are respectively formed so as to be able to separate the capacitance forming conductor patterns 212a to 212g from the first common conductor pattern 211a or the second common conductor pattern 211b individually.

The capacitance forming conductor patterns 212a to 212g in the present example are each formed as a conductor pattern in the shape of a strip. The widths (lengths in the lateral direction of the dielectric film 201) T of the capacitance forming conductor patterns 212a to 212g are selected to be equal to each other, and the lengths of the capacitance forming conductor patterns 212a to 212g in the winding direction of the capacitor 120 are selected to be different from each other, as shown in FIG. 7A. The capacitance forming conductor patterns 212a to 212g therefore constitute respective conductor regions having different areas. Spaces between the capacitance forming conductor patterns 212a to 212g are insulating parts having no conductor formed therein, excluding the parts of the conductor area changing conductor patterns 213a to 213g.

As described above, the second conductor layer 203 is uniformly formed on the side of the back surface 201b of the dielectric film 201. Therefore the capacitance forming conductor patterns 212a to 212g respectively form capacitors of capacitances corresponding to the respective areas of the capacitance forming conductor patterns 212a to 212g by being opposed to the second conductor layer 203 with the dielectric film 201 interposed between the capacitance forming conductor patterns 212a to 212g and the second conductor layer 203.

As shown in FIG. 7B, within the second conductor layer 203 on the side of the back surface 201b of the dielectric film 201, non-conductor regions 221a to 221g in which the conductor layer 203 is not formed are provided at positions corresponding to the positions of the axially disposed conductor patterns 214a to 214g that may be subsequently severed in the conductor area changing conductor patterns 213a to 213g of the first conductor layer 202 on the side of the front surface 201a. The non-conductor regions 221a to 221g are provided to prevent the conductor layer 202 on the side of the front surface 201a and the conductor layer 203 on the side of the back surface 201b from being electrically connected to each other when the conductor layer in the axially disposed conductor patterns 214a to 214g of the conductor area changing conductor patterns 213a to 213g is severed and the conductor layer 203 is present on the back surface 201b side of the axially disposed conductor patterns 214a to 214g.

The first common conductor pattern 211a is formed over most of a remaining region other than the capacitance forming conductor patterns 212a to 212g on the front surface 201a of the dielectric film 201. In the present example, of the plurality of capacitance forming conductor patterns 212a to 212g, the capacitance forming conductor patterns 212a to 212d are set as a first group, which is coupled to the first common conductor pattern 211a via the conductor area changing conductor patterns 213a to 213d. The first common conductor pattern 211a also forms a capacitor of a capacitance corresponding to the area of the first common conductor pattern 211a by being opposed to the second conductor layer 203 on the side of the back surface 201b with the dielectric film 201 interposed between the first common conductor pattern 211a and the second conductor layer 203.

In addition, of the plurality of capacitance forming conductor patterns 212a to 212g, the capacitance forming conductor patterns 212e to 212g are set as a second group, which is coupled to the second common conductor pattern 211b via the conductor area changing conductor patterns 213e to 213g.

In the present example, the dielectric film 201 has circular projection parts 231 and 232 that form lid parts at both ends in the winding axial core direction when the dielectric film 201 is wound into the shape of a rod and formed as the capacitor 120. The circular projection parts 231 and 232 in the dielectric film 201 are regions used as electrode leading parts of the capacitor 120 in the present example, and are formed at both of a left end and a right end in the axial core direction on the winding end edge side when the dielectric film 201 is wound into the shape of a rod.

In the capacitor 120 in the present example, as shown in FIG. 7A, a ring-shaped electrode conductor 215 is formed on the circular projection part 231. The ring-shaped electrode conductor 215 is extended out from the first common conductor pattern 211a connected to the capacitance forming conductor patterns 212a to 212d in the first group in the first conductor layer 202 formed on the front surface 201a of the dielectric film 201.

On the other hand, an electrode conductor 216 substantially in the shape of a half ring extended out from the second common conductor pattern 211b formed so as to be connected to the capacitance forming conductor patterns 212e to 212g in the second group is formed on the circular projection part 232, and an electrode conductor 217 substantially in the shape of a half ring extended out from the first common conductor pattern 211a is formed on the circular projection part 232 such that the substantially half ring-shaped electrode conductors 216 and 217 are disconnected from each other.

Further, in the capacitor 120 in the present example, as shown in FIG. 7B and FIG. 9, the dielectric film 201 is wound together with the insulating film 205 while an axial core conductor 240 formed of a conductor metal such as aluminum, for example, is used as a central axial core. An electrode is drawn out from the second conductor layer 203 formed on the back surface 201b of the dielectric film 201 by using the axial core conductor 240. That is, as indicated by a dotted line in FIG. 7B, the axial core conductor 240 is an axial core to be wound in a state of being compression-bonded and electrically connected to the second conductor layer 203. The length of the axial core conductor 240 is selected to be slightly larger than the lateral width of the dielectric film 201.

Through holes 231a and 232a, through which both ends of the axial core conductor 240 penetrate to be projected and exposed to the outside, are formed in central parts of the circular projection parts 231 and 232 of the dielectric film 201. An insulating region in which no conductor layer is formed is present between the through hole 231a and the ring-shaped electrode conductor 215 so that the axial core conductor 240 and the ring-shaped electrode conductor 215 are electrically disconnected from each other. Similarly, an insulating region in which no conductor layer is formed is present between the through hole 232a and the substantially half ring-shaped electrode conductors 216 and 217 so that the axial core conductor 240 and the substantially half ring-shaped electrode conductors 216 and 217 are electrically disconnected from each other.

When the dielectric film 201 and the insulating film 205 have been wound as shown in FIG. 9 to form the rod-shaped capacitor 120, the circular projection parts 231 and 232 are bent to end surface sides in the axial core direction of the rod-shaped capacitor 120, so that both end parts of the axial core conductor 240 penetrating through the through holes 231a and 232a of the circular projection parts 231 and 232 project to the outside. Flap parts 231b and 232b, which are formed so as to extend from the respective circular projection parts 231 and 232, are bonded to the circumferential side surface of the rod-shaped body. The circular projection parts 231 and 232 are thereby fixed in a state of forming lids in the winding end surfaces of the capacitor 120.

When the dielectric film 201 is wound as it is, the first conductor layer 202 and the second conductor layer 203 on the front side and the back side are electrically connected to each other. In order to prevent this, in the present example, as shown in FIG. 9, the capacitor 120 is formed with the insulating film 205 superposed and wound on the front surface 201a of the dielectric film 201. The insulating film 205 is formed of a plain dielectric film without any conductor formed thereon.

Figure 8:
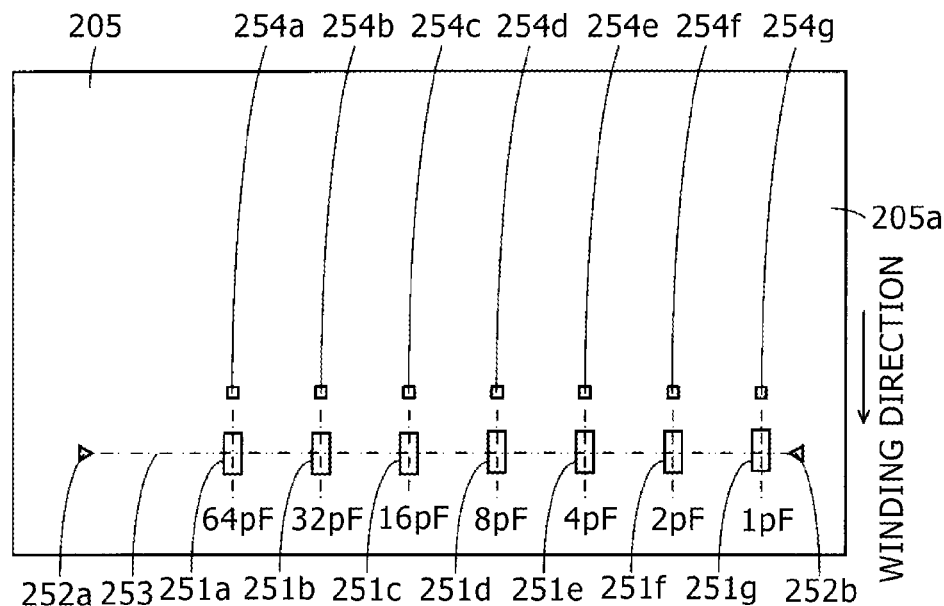
FIG. 8 is a diagram explaining the example of the rod-shaped capacitor used in the example of the position indicator of FIG. 6.
Figure 9:
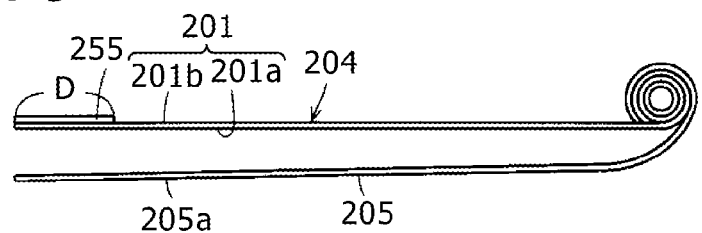
FIG. 9 is a diagram explaining the example of the rod-shaped capacitor used in the example of the position indicator of FIG. 6.
Figure 10:
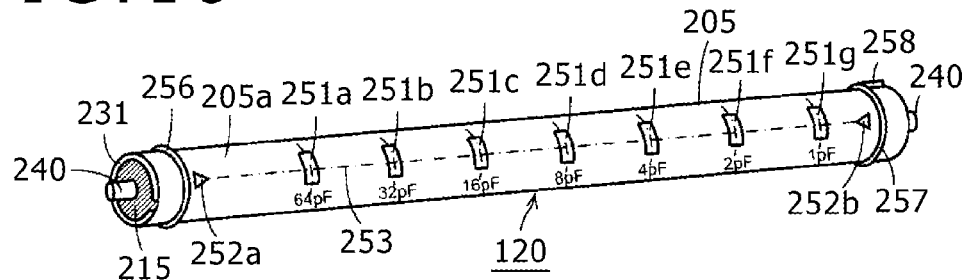
FIG. 10 is a diagram explaining the example of the rod-shaped capacitor used in the example of the position indicator of FIG. 6.

As shown in FIG. 8, on the winding end edge side of the insulating film 205 and on the side of a surface 205a exposed to the outside after the winding is finished, severing marks 251a to 251g are formed by printing, for example, and displayed in positions corresponding to the respective axially disposed conductor patterns 214a to 214g of the conductor area changing conductor patterns 213a to 213g formed in the first conductor layer 202 on the dielectric film 201 when the insulating film 205 is superposed and wound on the dielectric film 201 as shown in FIG. 9.

As shown in FIG. 8, capacitance values corresponding to the respective areas of the capacitance forming conductor patterns 212a to 212g, which are electrically disconnected and separated when the axially disposed conductor patterns 214a to 214g of the conductor area changing conductor patterns 213a to 213g are severed, are printed, for example, in the vicinities of the respective severing marks 251a to 251g.

When the film capacitor 204 and the insulating film 205 are wound with the axial core conductor 240 as an axial core as shown in FIG. 9, the severing marks 251a to 251g and the printed capacitance values are exposed to the outermost circumferential surface of the rod-shaped capacitor 120, as shown in FIG. 10.

As shown in FIG. 7A, the axially disposed conductor patterns 214a to 214g of the conductor area changing conductor patterns 213a to 213g are formed so as to be arranged in a row and at equal intervals in the axial core direction of the rod-shaped capacitor 120 in the same position in the circumferential direction of the rod-shaped capacitor 120. Thus, as shown in FIG. 10, the severing marks 251a to 251g and the capacitance values are arranged in a row and at equal intervals in the axial core direction of the rod-shaped capacitor 120.

As shown in FIG. 8, circumferential direction position marks 252a and 252b and a line segment mark 253 connecting these marks 252a and 252b to each other are formed by printing, for example, and displayed on the insulating film 205 in order to indicate the positions in the circumferential direction of the axially disposed conductor patterns 214a to 214g of the conductor area changing conductor patterns 213a to 213g.

Further, axial core direction marks 254a to 254g are formed by printing, for example, and displayed on the insulating film 205 at the same positions in the axial core direction as the respective severing marks 251a to 251g and at positions offset from the respective severing marks 251a to 251g by a predetermined length in the circumferential direction of the rod-shaped capacitor 120.

Therefore, even when the axially disposed conductor patterns 214a to 214g of the conductor area changing conductor patterns 213a to 213g of the film capacitor 204, which is formed by the first conductor layer 202 and the second conductor layer 203 opposed to each other with the dielectric film 201 interposed between the first conductor layer 202 and the second conductor layer 203, are hidden by the insulating film 205, the conductor area changing conductor patterns 213a to 213g can be severed accurately and surely by performing a severing process with the help of all or a part of the severing marks 251a to 251g, the circumferential direction position marks 252a and 252b, the line segment mark 253, the axial core direction marks 254a to 254g, and the numerical display of the capacitance values.

The capacitance value of the capacitor 120 may be adjusted by the manual work of an adjuster, or may be adjusted by performing an automatic severing process with the help of all or a part of the severing marks 251a to 251g, the circumferential direction position marks 252a and 252b, the line segment mark 253, the axial core direction marks 254a to 254g, and the numerical display of the capacitance values.

Severing by the above-described severing means is performed from the side of the surface 205a of the insulating film 205 in FIG. 10. In order to prevent the severing from reaching a wound part under the axially disposed conductor patterns 214a to 214g, in the present example, as shown in FIG. 9, a severing preventing sheet 255 is laminated and formed on a partial region of a length D equal to or more than the length of one round of the capacitor 120 from the winding end edge of the back surface 201b of the dielectric film 201 forming the film capacitor 204 in a part in the vicinity of the winding end edge.

As shown in FIG. 10, ring-shaped projection parts 256 and 257 are formed in the vicinities of both ends in the axial core direction of the rod-shaped capacitor 120. The ring-shaped projection parts 256 and 257 are fitted into and engaged with coupling adapters 140 and 150 used (see FIG. 6) when the above-described capacitor 120 is coupled to the variable capacitance type capacitor 10 and the like.

In addition, an axial core direction projection part 258 for regulating a position in the circumferential direction when fitted into the coupling adapter 150 to be described later is formed on the end part in the axial core direction of the rod-shaped capacitor 120 on an opposite side from the end part in the axial core direction of the rod-shaped capacitor 120 in which end part the electrode conductor 215 is formed. The axial core direction projection part 258 is formed along the axial core direction from a predetermined position in the circumferential direction of the ring-shaped projection part 257 to the end part in the axial core direction, where the electrode conductors 216 and 217 (not shown in FIG. 10, but see FIG. 12D) are formed.

These projection parts 256 and 257 can be formed by inserting a linear member in a direction along the winding direction when the film capacitor 204 and the insulating film 205 are wound into the shape of a rod. In addition, the projection part 258 can be formed by inserting a linear member in a direction orthogonal to the winding direction when the film capacitor 204 and the insulating film 205 are wound into the shape of a rod.

FIGS. 11A to 11C are diagrams explaining an example of construction of the coupling adapter 140. FIG. 11A is a diagram of the coupling adapter 140 as viewed from the side to be coupled to the capacitor 120. FIG. 11B is a sectional view taken along a line C-C of FIG. 11A. FIG. 11C is a diagram explaining the coupling of the capacitor 120 to the coupling adapter 140, which is engaged with the variable capacitance type capacitor 10 coupled to the ferrite core 111 around which the coil 112 is wound.

As shown in FIGS. 11A and 11B, the coupling adapter 140 is molded so as to form a depression part 142A, into which to fit the variable capacitance type capacitor 10, and a depression part 142B, into which to fit the capacitor 120, in a main body part 141 formed of a cylindrical resin member. Inserted in the main body part 140 are terminal members 143 and 144 made of an elastic conductive metal, which are for electrically connecting one end 112a and another end 112b of the coil 112, the first and second electrodes of the variable capacitance type capacitor 10, and the axial core conductor 240 and the electrode conductor 215 of the capacitor 120.

The depression part 142A is a circular depression hole having an inside diameter substantially equal to the outside diameter of the coupling member 5 of the variable capacitance type capacitor 10. A ring-shaped depression groove 145A, into which to fit the ring-shaped projection part 54 formed on the outer circumferential surface of the coupling member 5 of the variable capacitance type capacitor 10, is formed in the side wall of the depression part 142A. In addition, a ring-shaped depression groove 145B, into which to fit the ring-shaped projection part 256 provided on the end part on the side where the electrode conductor 215 of the rod-shaped capacitor 120 is formed, is formed in the side wall of the depression part 142B.

In addition, as shown in FIG. 11A, depression grooves 146 and 147 in a direction along the direction of the central axis of the cylinder are formed in positions of the circumferential side surface of the main body part 141 which are separated from each other by 180 degrees in the present example. First end parts 143a and 144a of the terminal members 143 and 144 are set within the depression grooves 146 and 147 in a state of being planted (erected) in a direction orthogonal to the circumferential direction. As shown in FIG. 11A, V-shaped notches 143b and 144b are formed in the first end parts 143a and 144a in the planted state of the terminal members 143 and 144.

In the coupling adapter 140, a second end part 143c of the terminal member 143 is formed so as to be exposed from the bottom part of the depression part 142A. In addition, a depression hole 148A having a diameter slightly larger than the diameter of the end 52a of the coil spring 52 projecting from the coupling member 5 of the variable capacitance type capacitor 10 is formed in the center of the bottom part of the depression part 142A. A second end part 144c of the terminal member 144 is situated within the depression hole 148A. An insertion hole 144d, into which the end 52a of the coil spring 52 can be inserted and which involves a bent part of the elastic conductive metal, is formed at a part of the second end part 144c of the terminal member 144 which is situated within the depression hole 148A.

Thereby, as shown in FIG. 11C, when the coupling member 5 of the variable capacitance type capacitor 10 is inserted into the depression part 142A of the coupling adapter 140, the end 52a of the coil spring 52 as the first electrode of the variable capacitance type capacitor 10 is electrically connected to the terminal member 144, and the metallic electrode 51 as the second electrode of the variable capacitance type capacitor 10 is electrically connected to the terminal member 143.

At this time, the ring-shaped projection part 54 formed on the outer circumferential surface of the coupling member 5 of the variable capacitance type capacitor 10 is fitted into the ring-shaped depression groove 145A formed in the depression part 142A of the coupling adapter 140, so that the coupling adapter 140 is locked to the variable capacitance type capacitor 10.

In this coupled state, the one end 112a of the coil 112 is press-fitted into the V-shaped notch 143b of the first end part 143a of the terminal member 143, so that the one end 112a of the coil 112 and the V-shaped notch 143b of the first end part 143a of the terminal member 143 are electrically connected to each other, and the other end 112b of the coil 112 is press-fitted into the V-shaped notch 144b of the first end part 144a of the terminal member 144, so that the other end 112b of the coil 112 and the V-shaped notch 144b of the first end part 144a of the terminal member 144 are electrically connected to each other.

In addition, in the bottom part of the depression part 142B of the coupling adapter 140, a third end part 143d of the terminal member 143 is formed so as to be exposed from the bottom part of the depression part 142B. Thereby, as shown in FIG. 11C, the electrode conductor 215 of the capacitor 120 and the terminal member 143 are electrically connected to each other when the rod-shaped capacitor 120 is inserted into the depression part 142B.

In addition, a depression hole 148B having a diameter slightly larger than the diameter of the axial core conductor 240 of the capacitor 120 is formed in the center of the bottom part of the depression part 142B. A third end part 144e of the terminal member 144 is situated within the depression hole 148B. An insertion hole 144f, into which the axial core conductor 240 of the capacitor 120 can be inserted and which involves a bent part of the elastic conductive metal, is formed at a part of the third end part 144e of the terminal member 144 which is situated within the depression hole 148B.

Therefore, when the capacitor 120 is inserted into the depression part 142B, the axial core conductor 240 of the capacitor 120 is inserted into the insertion hole 144f so as to come into contact with the bent part of the elastic conductive metal. The axial core conductor 240 and the terminal member 144 are thereby electrically connected to each other. In addition, the electrode conductor 215 of the capacitor 120 is electrically connected to the third end part 143d of the terminal member 143. The ring-shaped projection part 256 of the capacitor 120 is fitted into the ring-shaped depression groove 145B of the depression part 142B of the coupling adapter 140. The capacitor 120 is thereby locked to the coupling adapter 140.

Thus, the coupling adapter 140 couples the variable capacitance type capacitor 10 and the capacitor 120 to each other, and connects the variable capacitance type capacitor 10 and the capacitor 120 in parallel with each other between the one end 112a and the other end 112b of the coil 112.

As shown in FIG. 6, the second case 103 is screwed into the first case 102 of the position indicator 100. When pen pressure is applied to the core body 113, the projection part 111a of the ferrite core 111 displaces the column-shaped part 21 of the inside member 2 of the variable capacitance type capacitor 10 in the direction of the central axis with respect to the outside member 1, as described above.

Next, the push switch 130 is a switch to be turned on or off by the pressing by a user of a pressing part exposed to the outside of the case 101 via a through hole (not shown) provided in the side surface of the case 101. This push switch 130 is to perform on/off control as to whether or not to use the capacitance forming conductor patterns 212e to 212g in the second group of the capacitor 120 described above. That is, the push switch 130 performs on/off control as to whether or not to use a capacitance formed by the capacitance forming conductor patterns 212e to 212g in the second group as a parallel resonance path in conjunction with the coil 112. Therefore turning on and off the push switch 130 changes a capacitor connected in parallel in the resonance circuit, and thus changes the phase (resonance frequency) of an electromagnetic wave transmitted from the coil of the resonance circuit to the position detecting device.

As will be described later, the position detecting device can detect that the push switch 130 of the position indicator 100 is turned on by detecting a change in the phase (frequency) of the electromagnetic wave from the position indicator 100, which is received by a loop coil. An electronic device such as a personal computer or the like including the position detecting device or being connected to the position detecting device assigns and sets various operating input functions, such as a determining operating input, for example, to the operation of turning on and off the push switch 130, which operation is detected by the position detecting device.

The push switch 130 used in the present example has a cylindrical casing shape. A pressing operation part 130p is exposed to the circumferential side surface of the cylindrical casing. When the pressing operation part 130p is pressed, a switch provided within the casing is turned on or off. Though not shown in the figures, the second case 103 of the position indicator 100 is provided with a through hole allowing the pressing operation part 130p of the push switch 130 to be accessible from the outside. The pressing operation part 130p of the push switch 130 is provided in the part of the through hole of the case 101 so as to allow pressing operation of the pressing operation part 130p of the push switch 130 from the outside.

The coupling adapter 150 for coupling between the push switch 130 and the capacitor 120 will next be described. FIGS. 12A to 12E are diagrams of assistance in explaining an example of construction of the coupling adapter 150. FIG. 12A is a diagram of the coupling adapter 150 as viewed from the side to be coupled to the capacitor 120. FIG. 12B is a sectional view taken along a line D-D of FIG. 12A. FIG. 12C is a diagram of the coupling adapter 150 as viewed from the side to be coupled to the push switch 130. FIG. 12D is a diagram showing the end part of the capacitor 120 on the side to be coupled to the coupling adapter 150. FIG. 12E is a diagram showing the end part of the push switch 130 on the side to be coupled to the coupling adapter 150.

As shown in FIGS. 12A and 12B, the coupling adapter 150 is molded so as to form a depression part 152, into which to fit the capacitor 120, and a depression part 153, into which to fit the push switch 130, in a main body part 151 formed of a cylindrical resin member. Inserted into the main body part 151 are terminal members 154 and 155 made of an elastic conductive metal for electric connection with the electrode conductors 216 and 217 of the capacitor 120 and one terminal and another terminal of the push switch 130.

In this case, the depression part 152 is a circular depression hole having an inside diameter substantially equal to the diameter of the rod-shaped capacitor 120. Formed in the side wall of the depression part 152 are a ring-shaped depression groove 152a, into which to fit the ring-shaped projection part 257 (see FIG. 12D) provided on the end part of the rod-shaped capacitor 120 on the side where the electrode conductors 216 and 217 of the rod-shaped capacitor 120 are formed, and an axial core direction depression groove 152b, with which to engage the axial core direction projection part 258 (see FIG. 12D) formed on the capacitor 120. In addition, a depression hole 156, into which to insert the projecting part of the axial core conductor 240 of the capacitor 120, is formed in the bottom surface of the depression part 152. One end part 154a of the terminal member 154 and one end part 155a of the terminal member 155 are formed so as to be exposed in the bottom part of the depression part 152.

On the other hand, the depression part 153 is a circular depression hole having an inside diameter substantially equal to the diameter of the push switch 130 in the shape of a cylinder. Formed in the side wall of the depression part 153 are a ring-shaped depression groove 153a, into which to fit a ring-shaped projection part 130c provided on the end part of the cylindrical push switch 130 on the side where one terminal 130a and another terminal 130b of the push switch 130 are formed, as shown in FIG. 12E, and an axial core direction depression groove 153b, with which to engage an axial core direction projection part 130d (see FIG. 12E) formed on the push switch 130. Another end part 154b of the terminal member 154 and another end part 155b of the terminal member 155 are formed so as to be exposed in the bottom part of the depression part 153.

The side of the capacitor 120 where the circular projection part 232, on which the electrode conductors 216 and 217 shown in FIG. 12D are formed, forms an end surface is inserted into the depression hole 152 of the coupling adapter 150 in a state of alignment in the circumferential direction being performed by the axial core direction projection part 258 and the axial core direction depression groove 152b. Then, the axial core conductor 240 of the capacitor 120 is inserted into the depression hole 156, and is maintained in an electrically disconnected state. Meanwhile, the electrode conductor 216 of the capacitor 120 is elastically brought into pressure contact with and electrically connected to one end part 154a of the terminal member 154, and the electrode conductor 217 is elastically brought into pressure contact with and electrically connected to one end part 155a of the terminal member 155. Further, the ring-shaped projection part 257 of the capacitor 120 is fitted into the ring-shaped depression groove 152a of the depression part 152 of the coupling adapter 150. The capacitor 120 is thereby locked to the coupling adapter 150.

In addition, the side of the push switch 130, where the one terminal 130a and the other terminal 130b of the push switch 130 shown in FIG. 12E are formed, is inserted into the depression part 153 of the coupling adapter 150 in a state of alignment in the circumferential direction being performed by the axial core direction projection part 130d and the axial core direction depression groove 153b. Then, the one terminal 130a of the push switch 130 is elastically brought into pressure contact with and electrically connected to the other end part 154b of the terminal member 154, and the other terminal 130b of the push switch 130 is elastically brought into pressure contact with and electrically connected to the other end part 155b of the terminal member 155. Further, the ring-shaped projection part 130c of the push switch 130 is fitted into the ring-shaped depression groove 153a of the depression part 153 of the coupling adapter 150. The push switch 130 is thereby locked to the coupling adapter 150.

In the present example, a coil spring 160 is disposed in the second case 103 on an opposite side of the push switch 130 from the coupling adapter 150 to elastically displace the push switch 130 and the capacitor 120 in the direction of the core body 113 at all times. Thereby engaging relation between the push switch 130 and the capacitor 120 is maintained stably.

[Equivalent Circuit of Position Indicator 100]

Figure 13:
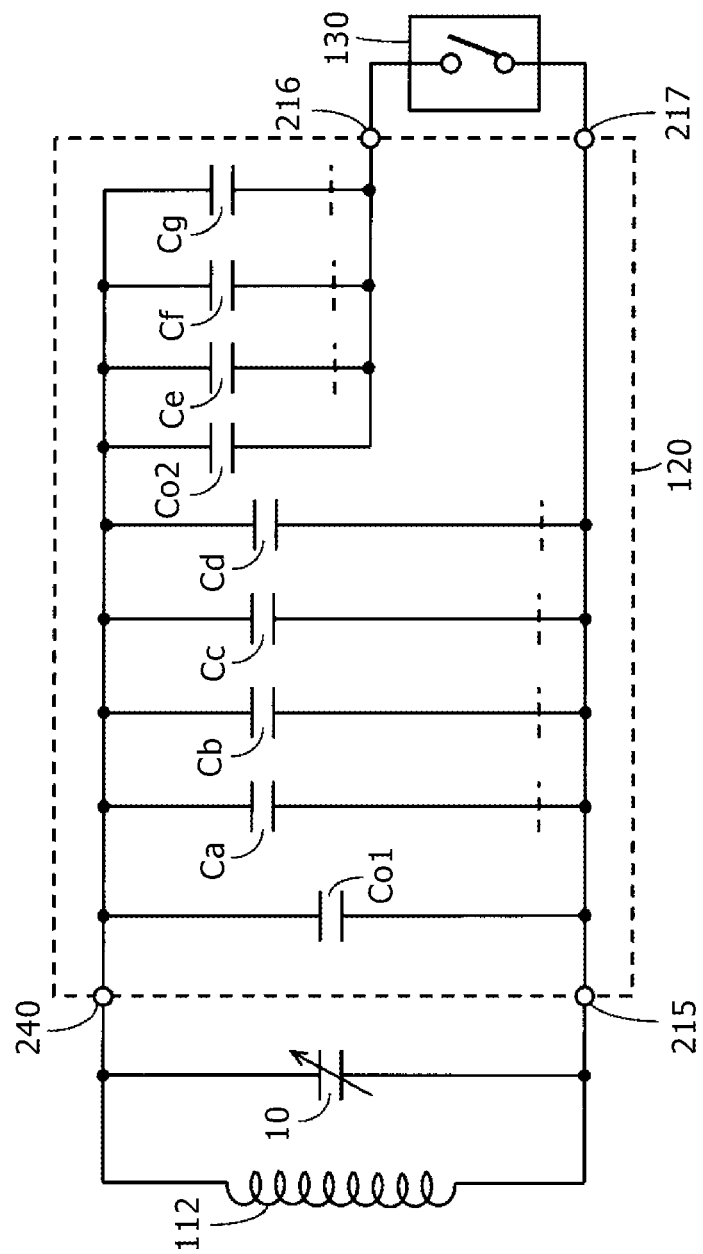
FIG. 13 is a diagram of an equivalent circuit in the example of the position indicator of FIG. 6.

FIG. 13 shows an equivalent circuit of a circuit configuration of the position indicator 100 in the present embodiment when the constituent parts of the position indicator 100 are coupled to each other as described above. A part enclosed by a dotted line in FIG. 13 is the rod-shaped capacitor 120.

In the rod-shaped capacitor 120 in FIG. 13, Co1 and Co2 denote capacitances corresponding to the areas of the first common conductor pattern 211a and the second common conductor pattern 211b, respectively, of the first conductor layer 202, the capacitances being formed by opposing the first common conductor pattern 211a and the second common conductor pattern 211b, respectively, to the second conductor layer 203 with the dielectric film 201 interposed between the first conductor layer 202 and the second conductor layer 203. In addition, Ca to Cg denote capacitances corresponding to the areas of the capacitance forming conductor patterns 212a to 212g, respectively, of the first conductor layer 202, the capacitances being formed by opposing the capacitance forming conductor patterns 212a to 212g, respectively, to the second conductor layer 203 with the dielectric film 201 interposed between the first conductor layer 202 and the second conductor layer 203.

The second conductor layer 203 on the side of the back surface 201b of the dielectric film 201 forms one electrode (common electrode) of a capacitor constituting the capacitances Co1 and Co2 and Ca to Cg. This common electrode is led out from the axial core conductor 240. In addition, as shown in FIG. 7A, the ring-shaped electrode conductor 215 on the circular projection part 231 is connected to the first common conductor pattern 211a of the conductor layer 202 formed on the front surface 201a of the dielectric film 201. The ring-shaped electrode conductor 215 thus forms another electrode of a capacitor constituting the capacitances Co1 and Ca to Cd corresponding to the areas of the capacitance forming conductor patterns 212a to 212d in the first group among the capacitance forming conductor patterns 212a to 212g.

In addition, the electrode conductor 215 is connected to the electrode conductor 217 through the first common conductor pattern 211a. Further, the electrode conductor 216 is connected to the second common conductor pattern 211b, and thus forms another electrode of a capacitor constituting the capacitance Co2 and the capacitances Ce to Cg corresponding to the areas of the second common conductor pattern 211b and the capacitance forming conductor patterns 212e to 212g in the second group among the capacitance forming conductor patterns 212a to 212g.

Therefore, as shown in FIG. 13, the capacitance Co1 corresponding to the area of the first common conductor pattern 211a and the capacitances Ca to Cd corresponding to the areas of the capacitance forming conductor patterns 212a to 212d are connected in parallel with each other between the axial core conductor 240, which forms an electrode connected to the second conductor layer 203, and the ring-shaped electrode conductor 215.

When one of the axially disposed conductor patterns 214a to 214d of the conductor area changing conductor patterns 213a to 213d is severed, the severed capacitance of the capacitances Ca to Cd connected in parallel with the capacitor Co1 is severed and disconnected at a position indicated by a dotted line in FIG. 13. A capacitance between the axial core conductor 240 forming the electrode and the ring-shaped electrode conductor 215 is decreased by the amount of the disconnected capacitance.

In addition, when the electrode conductor 216 and the electrode conductor 217 are electrically connected to each other, the capacitances Co1 and Co2 corresponding to the areas of the first common conductor pattern 211a and the second common conductor pattern 211b and the capacitances Ca to Cg corresponding to the areas of the capacitance forming conductor patterns 212a to 212g are connected in parallel with each other between the axial core conductor 240, which forms the electrode connected to the second conductor layer 203, and the ring-shaped electrode conductor 215.

When one of the axially disposed conductor patterns 214e to 214g of the conductor area changing conductor patterns 213e to 213g is severed, the severed capacitance of the capacitances Ce to Cg connected in parallel with the capacitor Co2 is severed and disconnected at a position indicated by a dotted line in FIG. 13. The capacitance of the rod-shaped capacitor 120 is decreased by the amount of the disconnected capacitance.

As shown in FIG. 13, the axial core conductor 240 and the ring-shaped electrode conductor 215 of the rod-shaped capacitor 120 are connected to one end and the other end of the coil 112 and connected to the first electrode and the second electrode of the variable capacitance type capacitor 10, and the one end and the other end of the coil 112 are connected in parallel with the first electrode and the second electrode of the variable capacitance type capacitor 10. In addition, one terminal and another terminal of the push switch 130 are connected between the electrode conductor 216 and the electrode conductor 217 of the rod-shaped capacitor 120.

As described above, the variable capacitance type capacitor 10 is connected in parallel with the coil 112, and the capacitances Co1 and Ca to Cd of the rod-shaped capacitor 120 are connected in parallel with the coil 112. Further, a circuit formed by connecting the push switch 130 in series with the parallel circuit of the capacitances Co2 and Ce to Cg is connected in parallel with the coil 112. Then, the parallel circuit of FIG. 13 forms a resonance circuit. The resonance frequency of the resonance circuit when the push switch 130 is off is adjusted by severing the capacitances Ca to Cd of the rod-shaped capacitor 120 as appropriate. In addition, the resonance frequency of the resonance circuit when the push switch 130 is on is adjusted by severing the capacitances Ce to Cg of the rod-shaped capacitor 120 as appropriate.

In the position indicator 100 in the present example, when a pressing force (pen pressure) is applied to the side of the core body 113 forming the pen point, the pressing force is transmitted to the rod-shaped projection part 111a of the ferrite core 111, and the rod-shaped projection part 111a presses the column-shaped part 21 of the inside member 2 of the variable capacitance type capacitor 10 via the thin wall part 4b of the bottom part of the protective case member 4. Then, the column-shaped part 21 of the inside member 2 of the variable capacitance type capacitor 10 is displaced in the direction of the central axis of the column-shaped part 21 against the displacement force of the coil spring 52. As described above, this changes the opposed area between the outside conductor pattern 11 formed on the outer circumferential surface of the outside member 1 and the inside conductor pattern formed on the outer circumferential surface of the column-shaped part 21 of the inside member 2, and thus changes the capacitance of the variable capacitance type capacitor 10.

The variable capacitance type capacitor 10 in the present embodiment forms the resonance circuit in a state of being connected in parallel with the coil 112, and therefore changes the resonance frequency of the resonance circuit according to the changed capacitance. That is, the resonance frequency (phase) of the electromagnetic wave transmitted from the coil 112 of the resonance circuit is changed. Therefore, when the position indicator 100 in the present example is used, the position detecting device having a circuit configuration shown in FIG. 14 as described in the following can detect a position indicated by the position indicator 100 and pen pressure in the position indicator 100.

Figure 14:
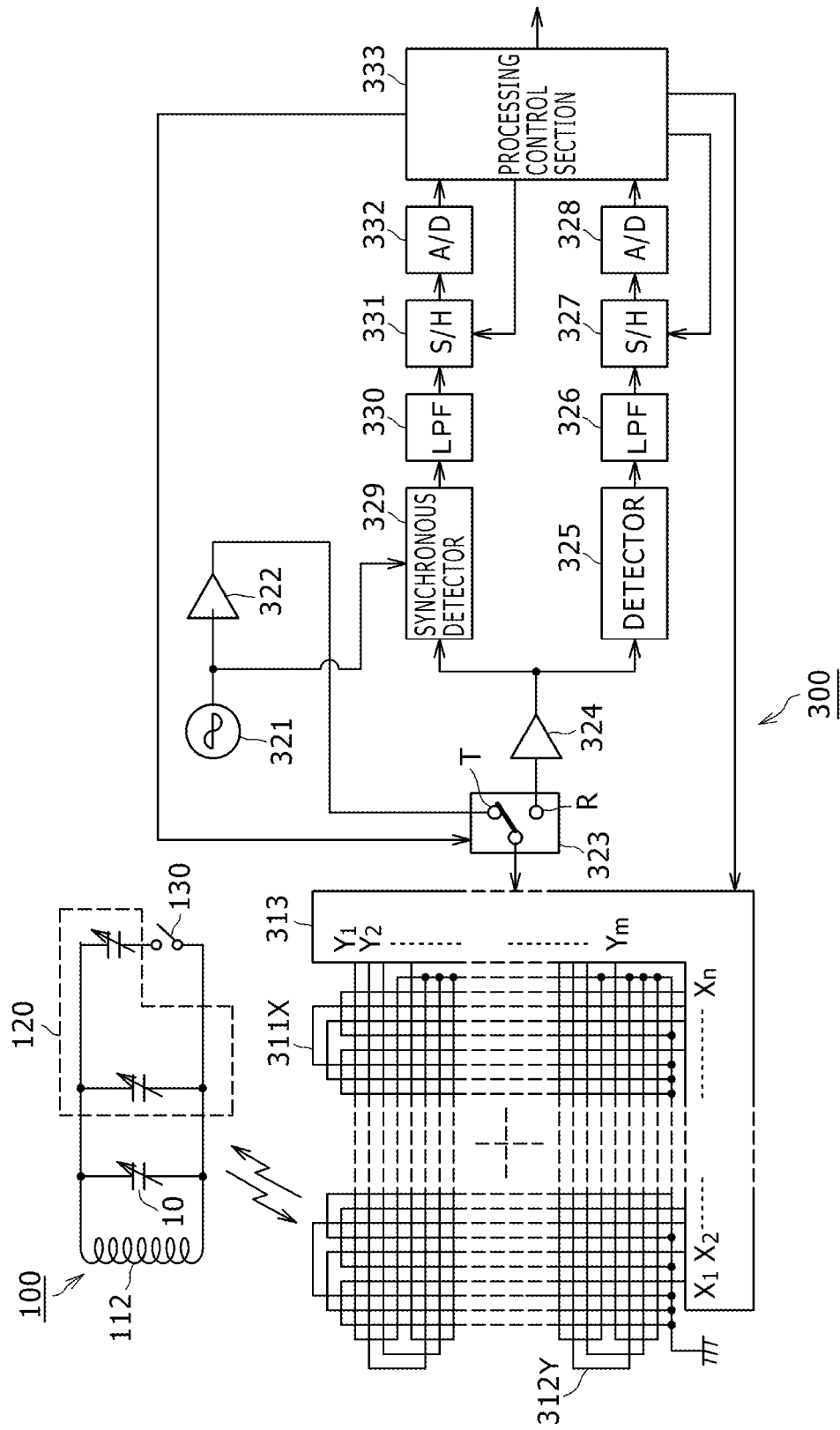
FIG. 14 is a diagram explaining an example of circuit configuration of a position detecting device using the example of the position indicator of FIG. 6.

An example of circuit configuration of the position detecting device 300 detecting the indicated position and detecting the pen pressure using the position indicator 100 described above will be described with reference to FIG. 14. FIG. 14 is a block diagram showing an example of circuit configuration of the position indicator 100 and the position detecting device 300.

The position indicator 100 includes the resonance circuit composed of the coil 112, the variable capacitance type capacitor 10, and the capacitor 120. The resonance circuit of the position indicator 100 also includes the push switch 130 for changing the resonance frequency.

As described above, the position indicator 100 changes the capacitance of the capacitor connected in parallel with the coil 112 according to the on/off state of the push switch 130, and thereby changes the resonance frequency of the resonance circuit. The position detecting device 300 detects a frequency shift (phase) in the resonance frequency of the resonance circuit of the position indicator 100, and thereby detects pen pressure and the on state of the push switch 130, as will be described later.

The position detecting device 300 has a position detecting coil formed by stacking an X-axis direction loop coil group 311X and a Y-axis direction loop coil group 312Y. The loop coil groups 311X and 312Y are for example composed of n rectangular loop coils and m rectangular loop coils, respectively. The loop coils forming the loop coil groups 311X and 312Y are disposed so as to be arranged at equal intervals and sequentially overlap each other.

The position detecting device 300 also includes a selecting circuit 313 connected with the X-axis direction loop coil group 311X and the Y-axis direction loop coil group 312Y. The selecting circuit 313 sequentially selects one loop coil of the two loop coil groups 311X and 312Y.

The position detecting device 300 further includes an oscillator 321, a current driver 322, a switching connecting circuit 323, a receiving amplifier 324, a detector 325, a low-pass filter 326, a sample and hold circuit 327, an A/D converter circuit 328, a synchronous detector 329, a low-pass filter 330, a sample and hold circuit 331, an A/D converter circuit 332, and a processing control section 333. The processing control section 333 is formed by a microcomputer.

The oscillator 321 generates an alternating-current signal of a frequency f0. The oscillator 321 supplies the generated alternating-current signal to the current driver 322 and the synchronous detector 329. The current driver 322 converts the alternating-current signal supplied from the oscillator 321 into a current, and sends out the current to the switching connecting circuit 323. The switching connecting circuit 323 selects a connection destination (a transmitting side terminal T or a receiving side terminal R), to which the loop coil selected by the selecting circuit 313 is connected, under control of the processing control section 333. Of the connection destinations, the transmitting side terminal T is connected with the current driver 322, and the receiving side terminal R is connected with the receiving amplifier 324.

An induced voltage generated in the loop coil selected by the selecting circuit 313 is sent to the receiving amplifier 324 via the selecting circuit 313 and the switching connecting circuit 323. The receiving amplifier 324 amplifies the induced voltage supplied from the loop coil, and sends out the amplified induced voltage to the detector 325 and the synchronous detector 329.

The detector 325 detects the induced voltage generated in the loop coil, that is, a received signal, and sends out the received signal to the low-pass filter 326. The low-pass filter 326 has a cutoff frequency sufficiently lower than the above-mentioned frequency f0. The low-pass filter 326 converts the output signal of the detector 325 into a direct-current signal, and sends out the direct-current signal to the sample and hold circuit 327. The sample and hold circuit 327 holds the output signal of the low-pass filter 326 in predetermined timing, specifically predetermined timing during a receiving period, and sends out the output signal of the low-pass filter 326 to the A/D (Analog to Digital) converter circuit 328. The A/D converter circuit 328 converts the analog output of the sample and hold circuit 327 into a digital signal, and outputs the digital signal to the processing control section 333.

Meanwhile, the synchronous detector 329 performs synchronous detection of the output signal of the receiving amplifier 324 with the alternating-current signal from the oscillator 321, and sends out a signal having a level corresponding to a phase difference between the output signal of the receiving amplifier 324 and the alternating-current signal from the oscillator 321 to the low-pass filter 330. The low-pass filter 330 has a cutoff frequency sufficiently lower than the frequency f0. The low-pass filter 330 converts the output signal of the synchronous detector 329 into a direct-current signal, and sends out the direct-current signal to the sample and hold circuit 331. The sample and hold circuit 331 holds the output signal of the low-pass filter 330 in predetermined timing, and sends out the output signal of the low-pass filter 330 to the A/D (Analog to Digital) converter circuit 332. The A/D converter circuit 332 converts the analog output of the sample and hold circuit 331 into a digital signal, and outputs the digital signal to the processing control section 333.

The processing control section 333 controls various parts of the position detecting device 300. Specifically, the processing control section 333 controls the selection of a loop coil in the selecting circuit 313, the switching of the switching connecting circuit 323, and the timing of the sample and hold circuits 327 and 331. The processing control section 333 makes an electromagnetic wave transmitted from the X-axis direction loop coil group 311X and the Y-axis direction loop coil group 312Y for a certain transmission duration on the basis of the input signals from the A/D converter circuits 328 and 332.

An electromagnetic wave transmitted from the position indicator 100 generates an induced voltage in each of the loop coils of the X-axis direction loop coil group 311X and the Y-axis direction loop coil group 312Y. The processing control section 333 calculates the coordinate values of an indicated position in the X-axis direction and the Y-axis direction, which position is indicated by the position indicator 100 on the basis of the level of the voltage value of the induced voltage generated in each loop coil. In addition, the processing control section 333 detects whether the push switch 130 is pressed or not on the basis of the level of a signal corresponding to a phase difference between the transmitted electromagnetic wave and the received electromagnetic wave.

Thus, in the position detecting device 300, the processing control section 333 can detect the position of the position indicator 100 that has approached the position detecting device 300. In addition, the processing control section 333 in the position detecting device 300 can detect pen pressure applied to the core body of the position indicator 100, and detect whether the push switch 130 is turned on in the position indicator 100, by detecting the phase (frequency shift) of the received signal.

As described above, the position detecting device 300 detects pen pressure and the on state of the push switch 130 by detecting a frequency shift (phase) in the resonance frequency of the resonance circuit of the position indicator 100.

Second Embodiment

In the foregoing first embodiment, the protective case member 4 is used for sealing on the side of the end surface 21a of the column-shaped part 21 of the inside member 2 and the side of the end surface 1c of the outside member 1. The thin wall part 4b is provided to the bottom part of the protective case member 4, and the pressing member presses and displaces the column-shaped part 21 of the inside member 2 in the direction of the central axis of the column-shaped part 21 via the thin wall part 4b. However, the protective case member 4 can be omitted by changing the outside member to a bottomed hollow-shaped outside member 1A.

In addition, in the foregoing first embodiment, the coupling adapter 140 is used for coupling to the rod-shaped capacitor 120 when the position indicator 100 is formed. However, the coupling member 5 of the variable capacitance type capacitor can be formed so as to have the role of the coupling adapter 140 for coupling to the rod-shaped capacitor 120.

Figure 15:
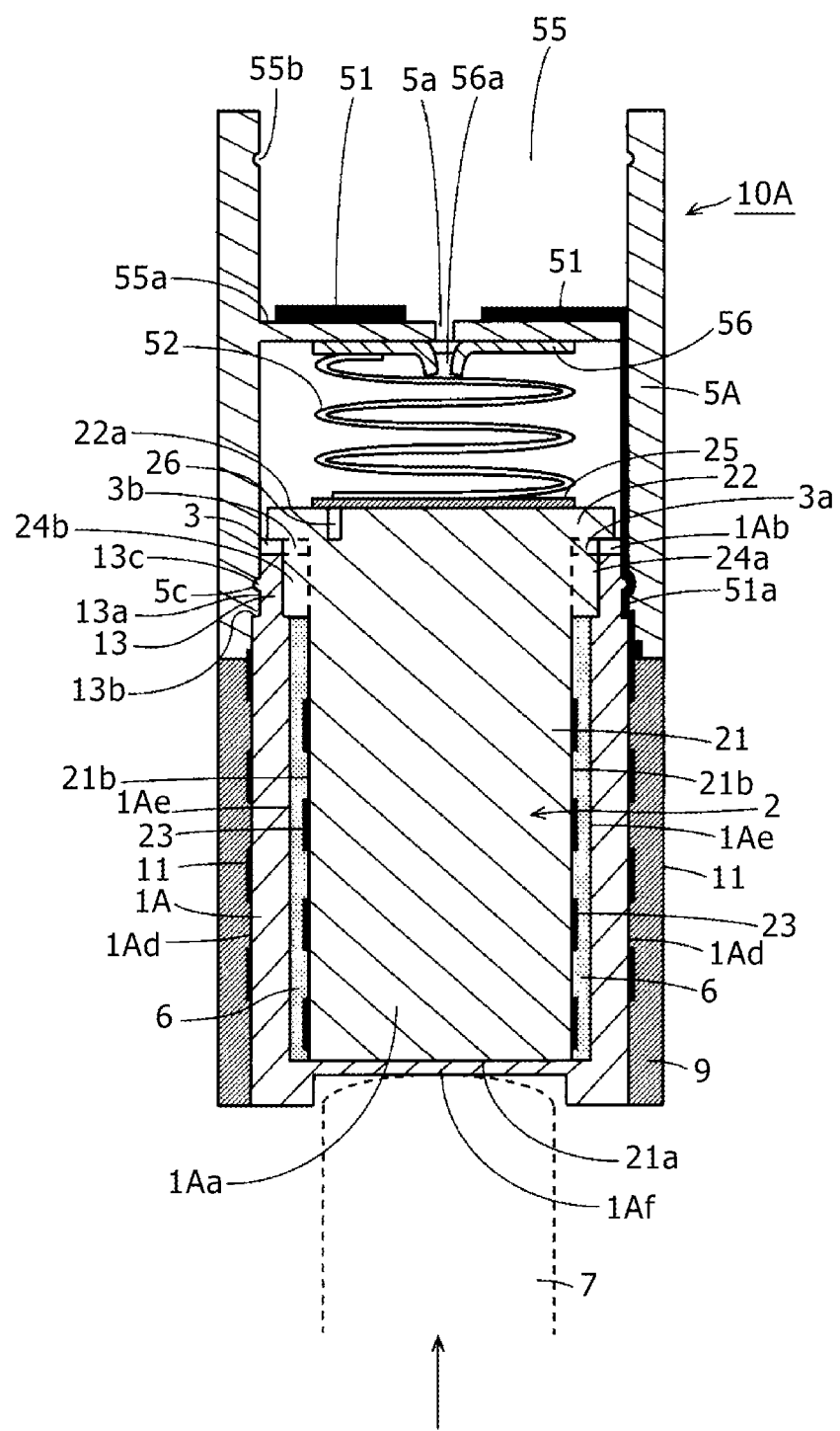
FIG. 15 is a sectional view of an example of construction of a second embodiment of the variable capacitance type capacitor according to the present invention.

A variable capacitance type capacitor in this second embodiment is an example in which the above is taken into consideration. FIG. 15 is a sectional view explaining a construction of the variable capacitance type capacitor 10A according to the second embodiment. In FIG. 15, the same constituent parts as those of the variable capacitance type capacitor 10 according to the first embodiment are identified by the same reference numerals. However, in the outside member 1A, parts corresponding to those of the outside member 1 of the variable capacitance type capacitor 10 according to the first embodiment will be described with the same suffixes a to e given to a reference 1A.

Specifically, in the second embodiment, a coupling member 5A has a shape formed by providing a depression part 55, into which to insert the rod-shaped capacitor 120, in the upper surface side of the coupling member 5 in the first embodiment. A conductor metal 51 in the shape of a doughnut forming a second electrode is formed on a bottom part 55a of the depression part 55. In the present embodiment, a ring-shaped depression groove 55b, with which to engage the ring-shaped projection part 256 of the rod-shaped capacitor 120, is formed in an inside wall surface of the depression part 55 of the coupling member 5A in place of the ring-shaped projection part 54.

A through hole 5a is formed in the center of the bottom part 55a of the depression part 55 of the coupling member 5A in a state of being separated from the doughnut-shaped conductor metal 51. An electrode conductor 56, which one end part of a coil spring 52 abuts against to be electrically connected to, is laminated and formed on the back side of the bottom part 55a of the depression part 55 of the coupling member 5A. The electrode conductor 56 is formed by an elastic conductive metal, for example. An insertion hole 56a made by a bent part of the elastic conductive metal is formed in the shape of a depression at a position corresponding to the through hole 5a.

That is, in the present example, the through hole 5a is provided in the center of the bottom part 55a of the depression part 55 of the coupling member 5A, and the depression hole 56a of the electrode conductor 56 is provided as a central conductor on the back side of the through hole 5a. The doughnut-shaped conductor metal 51 forming the second electrode as a peripheral conductor is formed on the periphery of the depression-shaped central conductor formed by the depression hole 56a of the electrode conductor 56.

Another end part of the coil spring 52 formed of a conductive metal is inserted into a depression hole 26 formed in an end surface 22a of a flange part 22 of an inside member 2, and is electrically connected to an electrode coupling conductor pattern 25 by abutting against the electrode coupling conductor pattern 25. As shown in FIG. 15, the one end part of the coil spring 52 abuts against the electrode conductor 56 on the back side of the bottom part 55a of the depression part 55, whereby the electrode conductor 56 is electrically connected to the electrode coupling conductor pattern 25. The electrode conductor 56 in the present example therefore forms a first electrode connected with an inside conductor pattern 23 of the variable capacitance type capacitor 10A.

In the variable capacitance type capacitor 10A according to the second embodiment, the conductor metal 51 formed on the bottom part 55a of the depression part 55 forms the second electrode.

Therefore, though not shown, when the side of the rod-shaped capacitor 120 where the ring-shaped electrode conductor 215 is formed is inserted into the depression part 55 of the variable capacitance type capacitor 10A according to the second embodiment, the axial core conductor 240 as a projection-shaped conductor is inserted into the depression hole 56a of the electrode conductor 56 as the depression-shaped central conductor, and the ring-shaped electrode conductor 215 abuts against the conductor metal 51. That is, the axial core conductor 240 of the rod-shaped capacitor 120 is electrically connected to the inside conductor pattern 23 of the variable capacitance type capacitor 10A, and the ring-shaped electrode conductor 215 of the rod-shaped capacitor 120 is electrically connected to an outside conductor pattern 11 of the variable capacitance type capacitor 10A. The ring-shaped projection part 256 of the rod-shaped capacitor 120 is fitted into the depression groove 55b of the depression part 55 of the coupling member 5A. The rod-shaped capacitor 120 is thereby locked in a state of being coupled to the variable capacitance type capacitor 10A.

In addition, as will be described in the following, the variable capacitance type capacitor 10A according to the second embodiment does not include the protective case member 4. That is, in the second embodiment, the outside member 1A is formed of PET, for example, and has a bottomed cylindrical shape having a hollow space. The bottom part of the outside member 1A in the present example is a thin wall part 1Af. The thin wall part 1Af is bent by the pressing of the pressing member 7 to displace the column-shaped part 21 of the inside member 2 in the direction of the central axis of the column-shaped part 21.

In the second embodiment, after the inside member 2 is housed in the outside member 1A, the coupling member 5A is mounted on the outside member 1A, as in the first embodiment. An outer circumferential surface 1Ad exposed to the outside of the outside member 1A is thereafter coated with an insulator 9 formed of a resin, for example, to protect the outside conductor pattern 11.

The other construction is similar to that of the variable capacitance type capacitor 10 in the first embodiment, and therefore description thereof will be omitted in the following. The variable capacitance type capacitor 10A in the second embodiment provides action and effect similar to those described above, the variable capacitance type capacitor 10A in the second embodiment being different from the variable capacitance type capacitor 10 in the first embodiment only in terms of the construction and the action and effect of the part where the rod-shaped capacitor 120 is coupled and fitted.

Other Embodiments and Examples of Modification

In the foregoing embodiments, the outside conductor pattern 11 and the inside conductor pattern 23 each have a pattern shape formed by connecting a plurality of ring-shaped conductor patterns, each having an opening, along the direction of the central axis using a connecting pattern disposed at the central parts in the circumferential direction of the plurality of ring-shaped conductor patterns. However, the position of the connecting pattern does not need to be the central parts in the circumferential direction of the ring-shaped conductor patterns.

Figure 16A:
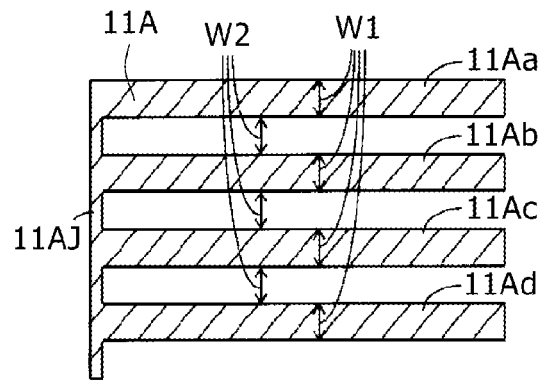
FIGS. 16A and 16B are diagrams showing another example of an outside conductor pattern and an inside conductor pattern in another embodiment of the variable capacitance type capacitor according to the present invention.

For example, an outside conductor pattern 11A in an example of FIG. 16A is formed by arranging a plurality of ring-shaped conductor patterns 11Aa to 11Ad of a same width W1 at intervals W2 in the direction of a central axis. The plurality of ring-shaped conductor patterns 11Aa to 11Ad are coupled to each other in the direction of the central axis by a connecting pattern 11AJ at left side end parts of the plurality of ring-shaped conductor patterns 11Aa to 11Ad.

Figure 16B:
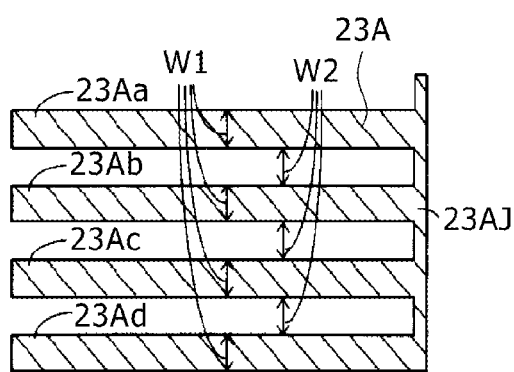

In addition, as shown in FIG. 16B, an inside conductor pattern 23A corresponding to the outside conductor pattern 11A is formed by arranging a plurality of ring-shaped conductor patterns 23Aa to 23Ad of the same width W1 at intervals W2 in the direction of a central axis. The plurality of ring-shaped conductor patterns 23Aa to 23Ad are coupled to each other in the direction of the central axis by a connecting pattern 23AJ at right side end parts of the plurality of ring-shaped conductor patterns 23Aa to 23Ad. In this case, W1≤W2, and the width W1 is about 200 μm, as described above.

In the example of FIGS. 16A and 16B, though not shown, openings are formed between the respective (free) end parts of the plurality of ring-shaped conductor patterns 11Aa to 11Ad of the outside conductor pattern 11A, on the outer circumferential surface 1d of an outside member 1, and the connecting pattern 11AJ. The openings and the connecting pattern 23AJ of the inside conductor pattern 23A, formed on the circumferential surface of a column-shaped part 21 of an inside member 2, are (adjacent to and) opposed to each other. In addition, openings are formed between the respective (free) end parts of the plurality of ring-shaped conductor patterns 23Aa to 23Ad of the inside conductor pattern 23A, formed on the circumferential surface of the column-shaped part 21 of the inside member 2, and the connecting pattern 23AJ. The openings and the connecting pattern 11AJ of the outside conductor pattern 11A on the outer circumferential surface 1d of the outside member 1 are (adjacent to and) opposed to each other.

In addition, the outside conductor pattern and the inside conductor pattern are not limited to a shape formed by coupling a plurality of ring-shaped conductor patterns to each other by a connecting pattern. For example, as shown in FIGS. 17A and 17B, the outside conductor pattern and the inside conductor pattern may be formed by arranging band-shaped conductor patterns in spiral shapes, which are similar to each other.

Figure 17A:
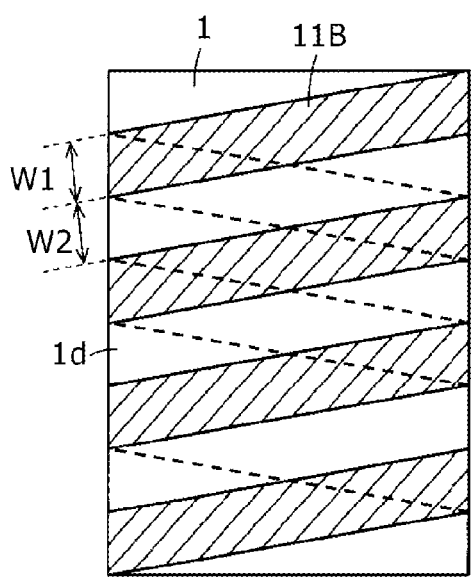
FIGS. 17A and 17B are diagrams showing a further example of an outside conductor pattern and an inside conductor pattern in a further embodiment of the variable capacitance type capacitor according to the present invention.
Figure 17B:
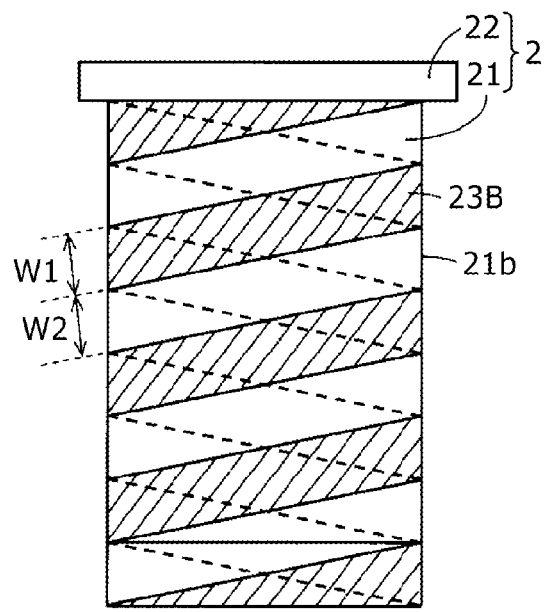

Specifically, as shown in FIG. 17A, a band-shaped conductor pattern 11B of a width W1 is laminated and formed into a spiral shape at intervals W2 on the outer circumferential surface 1d of an outside member 1. In addition, a band-shaped conductor pattern 23B of the width W1 is laminated and formed into a spiral shape similar to the conductor pattern 11B at intervals W2 on the circumferential surface 21b of a column-shaped part 21 of an inside member 2.

In this case, when the column-shaped part 21 of the inside member 2 is housed in the hollow space of the outside member 1, the conductor pattern 11B and the region of the intervals W2 of the conductor pattern 23B are opposed to each other, and the conductor pattern 23B and the region of the intervals W2 of the conductor pattern 11B are opposed to each other. In the present example, openings as provided in the ring-shaped conductor patterns need not be provided, and therefore the outer circumferential surface of the outside member 1 and the circumferential surface of the column-shaped part 21 of the inside member 2 can be efficiently used as the regions of conductor patterns for forming a capacitance.

In addition, in the foregoing first and second embodiments, the ring-shaped conductor patterns of the outside conductor pattern 11 and the inside conductor pattern 23 are formed in the circumferential direction as a direction orthogonal to the direction of the central axis of the outside member 1 and the inside member 2. However, it suffices for the ring-shaped conductor patterns of the outside conductor pattern 11 and the inside conductor pattern 23 to be formed in a circumferential direction intersecting the direction of the central axis of the outside member 1 and the inside member 2. Thus, the ring-shaped conductor patterns of the outside conductor pattern 11 and the inside conductor pattern 23 do not necessarily need to be formed in the direction orthogonal to the direction of the central axis. That is, each of the outside conductor pattern and the inside conductor pattern may be displaced by predetermined degrees with respect to the direction orthogonal to the direction of the central axis.

Figure 18A:
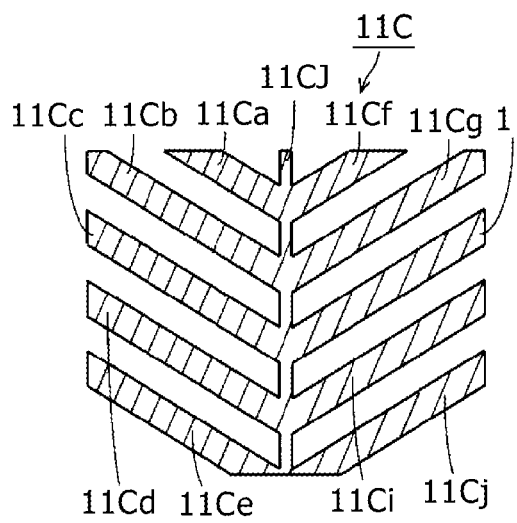
FIGS. 18A and 18B are diagrams showing a still further example of an outside conductor pattern and an inside conductor pattern in a still further embodiment of the variable capacitance type capacitor according to the present invention.
Figure 18B:
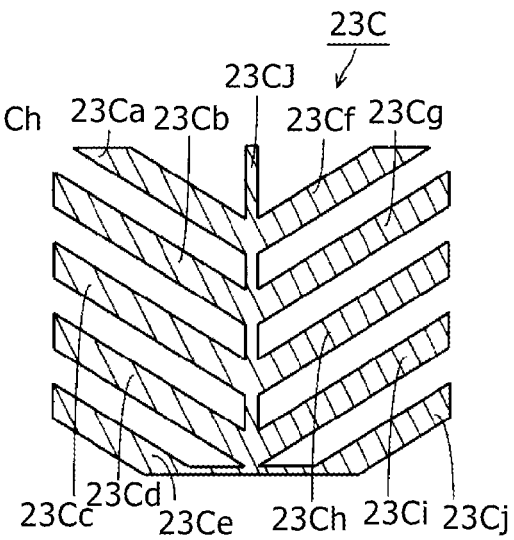

In an example of FIGS. 18A and 18B, an outside conductor pattern 11C has conductor patterns 11Ca to 11Ce and conductor patterns 11Cf and 11Cj formed from a connecting pattern 11CJ in an obliquely upward rightward direction and an obliquely upward leftward direction, respectively. An inside conductor pattern 23C has conductor patterns 23Ca to 23Ce and conductor patterns 23Cf and 23Cj formed from a connecting pattern 23CJ in an obliquely upward rightward direction and an obliquely upward leftward direction, respectively.

Figure 19A:
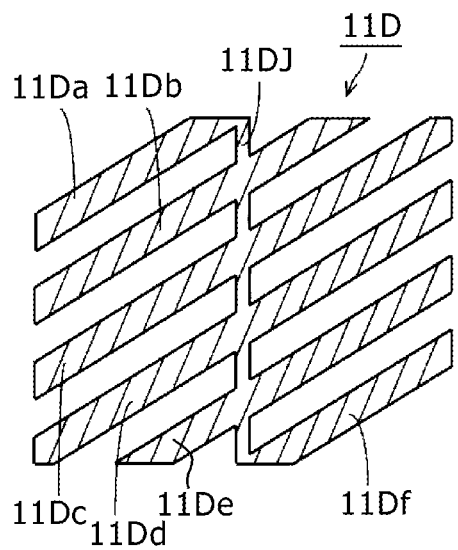
FIGS. 19A and 19B are diagrams showing an even further example of an outside conductor pattern and an inside conductor pattern in an even further embodiment of the variable capacitance type capacitor according to the present invention.
Figure 19B:
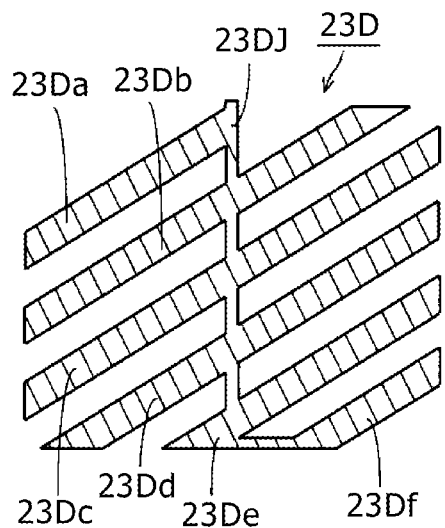

In addition, in an example of FIGS. 19A and 19B, an outside conductor pattern 11D has oblique conductor patterns 11Da to 11Df formed therein so as to cross a connecting pattern 11DJ, with the connecting pattern 11DJ as a center. An inside conductor pattern 23D has oblique conductor patterns 23Da to 23Df formed therein so as to cross a connecting pattern 23DJ, with the connecting pattern 23DJ as a center.

In addition, in the foregoing embodiments, the outside conductor pattern 11 and the inside conductor pattern 23 are formed on the outer circumferential surface 1d of the outside member 1 and the circumferential surface 21b of the column-shaped part 21 of the inside member 2 by deposition, for example. Therefore, as shown in the sectional view of FIG. 2, the outside conductor pattern 11 and the inside conductor pattern 23 slightly project from the outer circumferential surface 1d of the outside member 1 and the circumferential surface 21b of the column-shaped part 21 of the inside member 2 by the thickness of the outside conductor pattern 11 and the inside conductor pattern 23. The outside conductor pattern 11 and the inside conductor pattern 23 may thus be damaged or chipped.

Figure 20:
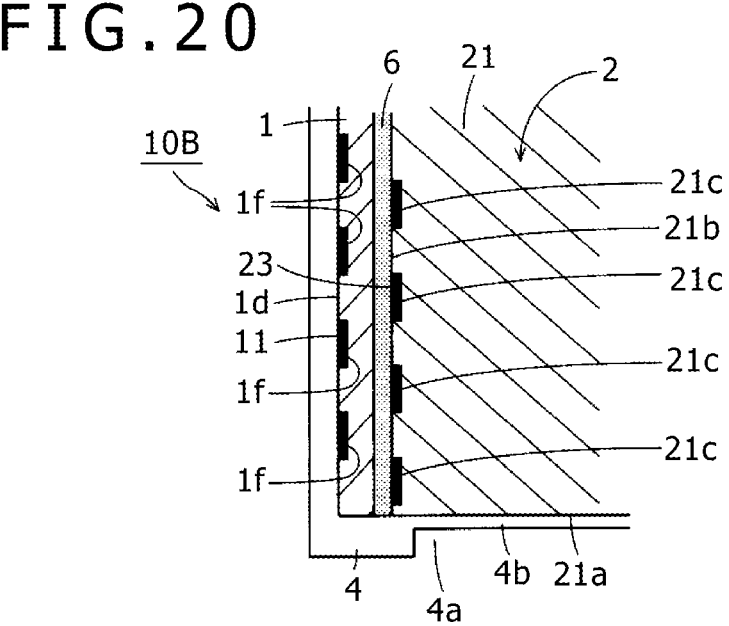
FIG. 20 is a diagram showing principal parts in an even further example of a method of forming an outside conductor pattern and an inside conductor pattern in an even further embodiment of the variable capacitance type capacitor according to the present invention.

FIG. 20 represents an example for preventing this. Depression parts 1f having a depth corresponding to the thickness of the outside conductor pattern 11 are formed in the outer circumferential surface 1d of the outside member 1 according to the pattern shape of the outside conductor pattern 11, and the outside conductor pattern 11 is formed in the depression parts 1f by deposition, for example. Similarly, as shown in FIG. 20, depression parts 21c having a depth corresponding to the thickness of the inside conductor pattern 23 are formed in the circumferential surface of the column-shaped part 21 of the inside member 2 according to the pattern shape of the inside conductor pattern 23, and the inside conductor pattern 23 is formed in the depression parts 21c by deposition, for example.

Then, the outer circumferential surface 1d of the outside member 1 and the exposed surface of the outside conductor pattern 11 are flush with each other. In addition, the circumferential surface 21b of the column-shaped part 21 of the inside member 2 and the exposed surface of the inside conductor pattern 23 are flush with each other. The outside conductor pattern 11 and the inside conductor pattern 23 do not project from the outer circumferential surface 1d of the outside member 1 and the circumferential surface 21b of the column-shaped part 21 of the inside member 2 by the thickness of the outside conductor pattern 11 and the inside conductor pattern 23. Hence, the conductor patterns 11 and 23 can be prevented from being damaged easily.

In addition, in the foregoing embodiments, the area in which the outside conductor pattern 11 and the inside conductor pattern 23 are opposed to each other changes the capacitance of the capacitor 10 when the pressing member displaces the inside member 2 in the direction of the central axis. However, as will be described in the following, the capacitance can also be varied by a change in dielectric constant $\in$ between an outside member and an inside member when a pressing member displaces the inside member 2 in the direction of a central axis.

Figure 21A:
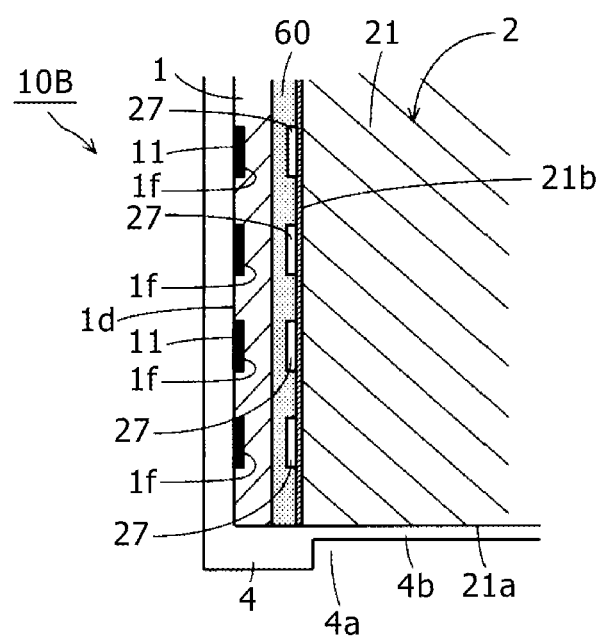
FIGS. 21A, 21B, and 21C are diagrams showing principal parts of an even further embodiment of the variable capacitance type capacitor according to the present invention.
Figure 21B:
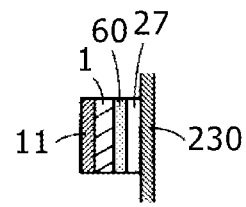
Figure 21C:
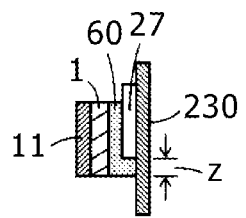

FIGS. 21A to 21C represent an example of construction of a variable capacitance type capacitor 10B in that case. In the example of FIGS. 21A to 21C, the same parts as in the variable capacitance type capacitor 10 described above are identified by the same reference numerals, and description thereof will be omitted. In the variable capacitance type capacitor 10B in the present example, an outside conductor pattern 11 similar to that of the first embodiment is formed on an outer circumferential surface 1d of an outside member 1. However, as shown in FIG. 21A, in the present example, as in the example of FIG. 20, depression parts 1f are formed in the outer circumferential surface 1d of the outside member 1, and the outside conductor pattern 11 is formed in the depression parts 1f by deposition, for example.

On the other hand, a conductor 230 is formed over the entire circumferential surface 21b of a column-shaped part 21 of an inside member 2. As with the inside conductor pattern 23, the conductor 230 is formed so as to be connected to an electrode coupling conductor pattern 25 for connection to a first electrode through a depression groove 22b of a flange part 22 not shown in FIGS. 21A to 21C (see FIG. 1).

A dielectric pattern 27 having the same shape as the outside conductor pattern 11 is formed on the conductor 230 by deposition or coating, for example, so as to be opposed to the outside conductor pattern 11 with the outside member 1 and a dielectric liquid 60 interposed between the outside conductor pattern 11 and the dielectric pattern 27. In this case, it suffices for the dielectric liquid 60 to have a low dielectric constant, or there may be an air layer in place of the liquid 60. The dielectric 27 is formed by a high dielectric constant dielectric such as silicone, for example.

As described above, in the variable capacitance type capacitor 10B in the present example, the conductor 230 on the column-shaped part 21 of the inside member 2 is formed on the entire circumferential surface 21b of the column-shaped part 21. The outside conductor pattern 11 having a total area So is thus opposed to the conductor 230 at all times.

The dielectric 27 is formed in the same shape as the outside conductor pattern 11 so as to be opposed to the outside conductor pattern 11. Thus, in a state in which the inside member 2 is not pressed by a pressing member, as shown in FIG. 21B, the outside member 1 formed of a dielectric, the liquid 60, and the dielectric 27 are interposed between the outside conductor pattern 11 and the conductor 230 on the column-shaped part 21 of the inside member 2 in the total opposed area So.

Letting $\in 1$ be the dielectric constant of the outside member 1, $\in 2$ be the dielectric constant of a part composed of the liquid 60 and the dielectric 27, and d be a distance between the inner circumferential surface 1e of the outside member 1 and the conductor 230, the capacitance CB of the variable capacitance type capacitor 10B in the present example is $$CB = \in B \times (So/d)$$

where $\in B$ is a composite value of the dielectric constant $\in 1$ of the outside member 1 and the dielectric constant $\in 2$ of the part composed of the liquid 60 and the dielectric 27.

When the inside member 2 is pressed by a pressing member and the inside member 2 is displaced by a distance z in the direction of the central axis of the inside member 2, as shown in FIG. 21C, the dielectric 27 is displaced by the distance z in the direction of the central axis of the inside member 2 with respect to the outside conductor pattern 11.

Then, the area of the dielectric 27 opposed to the outside conductor pattern 11 changes between the outside conductor pattern 11 and the conductor 230 on the column-shaped part 21 of the inside member 2. That is, between the outside member 1 and the conductor 230 on the column-shaped part 21 of the inside member 2, the part of the liquid 60 increases, and the part of the dielectric 27 decreases by an amount corresponding to the increase in the part of the liquid 60. Therefore, between the outside conductor pattern 11 and the conductor 230 on the column-shaped part 21 of the inside member 2, the dielectric constant 81 of the part of the outside member 1 does not change, but the dielectric constant of the part composed of the part of the liquid 60 and the dielectric 27 changes to $\in 2'$.

Thereby, the dielectric constant between the outside conductor pattern 11 and the conductor 230 on the column-shaped part 21 of the inside member 2 becomes a value $\in B'$ that is different from the value $\in B$ in the case of FIG. 21A in which no external force is applied by the pressing member. Hence, the capacitance CB of the variable capacitance type capacitor 10B in the present example is $$CB = \in B' \times (So/d)$$

The dielectric constant $\in B'$ is a value corresponding to the displacement z corresponding to an external force of the pressing member. The capacitance CB of the variable capacitance type capacitor 10B in the present example is therefore a value corresponding to the external force of the pressing member.

In the example of FIGS. 21A to 21C, the outside conductor pattern 11 formed in the outer circumferential surface 1d of the outside member 1 is formed within the depression parts 1f. Thus, the outside conductor pattern 11 is closer to the circumferential surface of the inside member 2, and the capacitance CB of the variable capacitance type capacitor 10B in the present example is correspondingly increased.

In the above-described example of FIGS. 21A to 21C, the dielectric 27, further formed on the conductor 230 formed on the column-shaped part 21 of the inside member 2, is formed so as to be opposed to the outside conductor pattern 11 formed on the outer circumferential surface 1d of the outside member 1. However, as with the inside conductor pattern 23 in the foregoing embodiments, the dielectric 27 may be formed so as not to be opposed to the outside conductor pattern 11 in a state of no external force being applied by the pressing member. In that case, however, the capacitance CB of the variable capacitance type capacitor 10B changes in a different manner than in the above example.

Next, in the foregoing embodiments, the pressing of the inside member by the pressing member displaces the position in the direction of the central axis of the inside member with respect to the outside member. However, a construction can be formed in which the pressing of the outside member by the pressing member displaces the relative position in the direction of the central axis of the inside member with respect to the outside member.

In addition, in the foregoing embodiments, the outside member is a cylindrical member having a hollow part. However, the outside member may be a prismatic member that has a hollow part and whose section is a polygon, such as a quadrangular prism, a hexagonal prism, or the like. In addition, the hollow part of the outside member may be a prismatic shape rather than a cylindrical shape.

In addition, the inside member housed in the space of the hollow part of the outside member may have a prismatic shape rather than a cylindrical shape. The columnar shape of the hollow part of the outside member and the columnar shape of the inside member do not need to be shapes corresponding to each other. One of the outside member and the inside member may have a cylindrical shape, and the other may have a prismatic shape, or the outside member and the inside member may have prismatic shapes different from each other, as long as the inside member is housed in the outside member. Hence, a distance between the circumferential surface (column surface) of the column body part of the inside member and the inner circumferential surface of the hollow part of the outside member may not be constant in the circumferential direction. That is, the position of the central axis of the hollow part of the outside member and the position of the central axis of the inside member do not necessarily need to coincide with each other. In short, it suffices to obtain a change in the capacitance exhibiting a predetermined change characteristic, which corresponds to an external force when the external force displaces the inside member relative to the outside member in the direction of the central axis.

In the foregoing embodiments, the area in which the outside conductor pattern and the inside conductor pattern are opposed to each other is zero when no external force is applied, and is increased according to an external force when the external force is applied. However, the outside conductor pattern and the inside conductor pattern may of course be partially opposed to each other even when no external force is applied.

In addition, the outside conductor pattern and the inside conductor pattern may have shapes substantially identical or similar to each other, and the area in which the outside conductor pattern and the inside conductor pattern are opposed to each other may be maximized when no external force is applied. When an external force is applied, the area in which the outside conductor pattern and the inside conductor pattern are opposed to each other may be decreased according to the external force.

The above description has been made by taking a position indicator as an example of an electronic device, in which a variable capacitance type capacitor according to the present invention is used. However, electronic devices to which a variable capacitance type capacitor according to the present invention is applied are not limited to position indicators, but a variable capacitance type capacitor according to the present invention is applicable to various electronic devices. For example, a variable capacitance type capacitor according to the present invention can be used as a frequency tuning capacitor in a tuning circuit for determining transmission frequency or reception frequency in a portable device having a short-range radio communication function, and adjust the transmission frequency or the reception frequency.

DESCRIPTION OF REFERENCE SYMBOLS

1 . . . Outside member, 2 . . . Inside member, 3 . . . Elastic member, 4 . . . Protective case member, 5 . . . Coupling member, 5a . . . Through hole, 11 . . . Outside conductor pattern, 21 . . . Column-shaped part, 22 . . . Flange part, 23 . . . Inside conductor pattern, 24a . . . Engaging projection, 25 . . . Electrode coupling conductor pattern, 26 . . . Depression hole, 51 . . . Conductor metal, 52 . . . Coil spring.

The invention claimed is:

1. A variable capacitance type capacitor comprising:
an inside member; and
an outside member including a space for housing the inside member;
the inside member having a columnar shape, and having a first conductor pattern formed on a circumferential surface of the inside member;
the outside member being a dielectric having a predetermined dielectric constant, and having a second conductor pattern formed on an outer circumferential surface of the outside member, the second conductor pattern being disposed so as to oppose the first conductor pattern formed on the circumferential surface of the inside member when the inside member is housed in the space of the outside member; and
the inside member housed in the space of the outside member and having the columnar shape being displaced relative to the outside member in a direction of a central axis of the inside member having the columnar shape in response to an externally applied force, whereby an opposed area formed between the first conductor pattern and the second conductor pattern disposed with the dielectric interposed between the first conductor pattern and the second conductor pattern changes, to thereby form a capacitance corresponding to the externally applied force between the first conductor pattern and the second conductor pattern;
wherein each of the first conductor pattern formed on the circumferential surface of the inside member and the second conductor pattern formed on the outer circumferential surface of the outside member includes a plurality of conductor patterns, which are formed to extend in a direction that intersects the direction of the central axis and are arranged along the direction of the central axis, and the plurality of conductor patterns arranged along the direction of the central axis are coupled to each other by a connecting pattern;
each of the conductor patterns of the first conductor pattern and the second conductor pattern are formed in a shape of a ring having an opening; and
the connecting pattern of the second conductor pattern is disposed so as to oppose the opening of the first conductor pattern, and the connecting pattern of the first conductor pattern is disposed so as to oppose the opening of the second conductor pattern.

2. The variable capacitance type capacitor according to claim 1, further comprising an engagement part configured to define a positional relation between the first conductor pattern formed on the circumferential surface of the inside member and the second conductor pattern formed on the outer circumferential surface of the outside member.

3. The variable capacitance type capacitor according to claim 2, wherein the engagement part defines a positional relation between the inside member and the outside member in a circumferential direction of each of the inside member and the outside member.

4. The variable capacitance type capacitor according to claim 1, further comprising a coupling member including a first electrode and a second electrode, the coupling member being configured to engage with a first axial end side of the outside member so as to connect the first conductor pattern to the first electrode and to connect the second conductor pattern to the second electrode, the first axial end side of the outside member being opposite from a second axial end side of the outside member from which the externally applied force is received.

5. The variable capacitance type capacitor according to claim 4, wherein an axial end surface of the inside member includes an electrode coupling pattern formed thereon, the axial end surface of the inside member being positioned adjacent to the first axial end side of the outside member with which the coupling member engages, the electrode coupling pattern being connected to the first conductor pattern, and wherein engaging the coupling member with the outside member causes the first electrode to be connected to the electrode coupling pattern.

6. The variable capacitance type capacitor according to claim 5, wherein the first electrode is connected to the electrode coupling pattern via a conductive member, and engaging the coupling member with the outside member causes the second electrode included in the coupling member to be in contact with the second conductor pattern formed on the outer circumferential surface of the outside member to thereby establish a connection therebetween.

7. The variable capacitance type capacitor according to claim 6, wherein the conductive member has elasticity in the direction of the central axis.

8. The variable capacitance type capacitor according to claim 4, wherein the first electrode and the second electrode are a central conductor and a peripheral conductor disposed on a periphery of the central conductor, respectively, provided on an end surface of the coupling member, the end surface of the coupling member being exposed in the direction of the central axis when the coupling member is engaged with the outside member.

9. The variable capacitance type capacitor according to claim 8, wherein the central conductor is formed either in a shape of a projection or in a shape of a depression for receiving a projection-shaped conductor.

10. A variable capacitance type capacitor comprising:
an inside member; and
an outside member including a space for housing the inside member;
the inside member having a columnar shape, and having a first conductor pattern formed on a circumferential surface of the inside member;
the outside member being a dielectric having a predetermined dielectric constant, and having a second conductor pattern formed on an outer circumferential surface of the outside member, the second conductor pattern being disposed so as to oppose the first conductor pattern formed on the circumferential surface of the inside member when the inside member is housed in the space of the outside member; and
the inside member housed in the space of the outside member and having the columnar shape being displaced relative to the outside member in a direction of a central axis of the inside member having the columnar shape in response to an externally applied force, whereby an opposed area formed between the first conductor pattern and the second conductor pattern disposed with the dielectric interposed between the first conductor pattern and the second conductor pattern changes, to thereby form a capacitance corresponding to the externally applied force between the first conductor pattern and the second conductor pattern,
wherein the inside member includes a projection part configured to define a positional relation between the inside member and the outside member in the direction of the central axis, which projects radially outward from the circumferential surface of the inside member.

11. The variable capacitance type capacitor according to claim 10, wherein each of the first conductor pattern formed on the circumferential surface of the inside member and the second conductor pattern formed on the outer circumferential surface of the outside member so as to oppose the first conductor pattern formed on the circumferential surface of the inside member includes a plurality of conductor patterns, which are formed to extend in a direction that intersects the direction of the central axis and are arranged along the direction of the central axis, and the plurality of conductor patterns arranged along the direction of the central axis are coupled to each other by a connecting pattern.

12. The variable capacitance type capacitor according to claim 11, wherein the conductor patterns of at least one of the first conductor pattern and the second conductor pattern are formed in a shape of a ring having an opening.

13. The variable capacitance type capacitor according to claim 12, wherein each of the first conductor pattern and the second conductor pattern is formed in a shape of a ring having an opening, the connecting pattern of the second conductor pattern is disposed so as to oppose the opening of the first conductor pattern, and the connecting pattern of the first conductor pattern is disposed so as to oppose the opening of the second conductor pattern.

14. The variable capacitance type capacitor according to claim 11, wherein each of the first conductor pattern and the second conductor pattern is tilted by a predetermined angle with respect to a direction orthogonal to the direction of the central axis.

15. The variable capacitance type capacitor according to claim 10, wherein the first conductor pattern formed on the circumferential surface of the inside member is formed in a spiral shape along the direction of the central axis, and the second conductor pattern formed on the outer circumferential surface of the outside member is formed in a spiral shape similar to the first conductor pattern.

16. The variable capacitance type capacitor according to claim 10, wherein the projection part is provided on one axial end surface side of the inside member having the columnar shape.

17. The variable capacitance type capacitor according to claim 16, further comprising an elastic member disposed at a position where the projection part of the inside member opposes the outside member.

18. The variable capacitance type capacitor according to claim 10, further comprising a coupling member including a first electrode and a second electrode, the coupling member being configured to engage with a first axial end side of the outside member so as to connect the first conductor pattern to the first electrode and to connect the second conductor pattern to the second electrode, the first axial end side of the outside member being opposite from a second axial end side of the outside member from which the externally applied force is received.

19. The variable capacitance type capacitor according to claim 18, wherein an axial end surface of the inside member includes an electrode coupling pattern formed thereon, the axial end surface of the inside member being positioned adjacent to the first axial end side of the outside member with which the coupling member engages, the electrode coupling pattern being connected to the first conductor pattern, and wherein engaging the coupling member with the outside member causes the first electrode to be connected to the electrode coupling pattern.

20. The variable capacitance type capacitor according to claim 18, wherein the first electrode and the second electrode are a central conductor and a peripheral conductor disposed on a periphery of the central conductor, respectively, provided on an end surface of the coupling member, the end surface of the coupling member being exposed in the direction of the central axis when the coupling member is engaged with the outside member.

* * * * *